US012804729B2

(12) United States Patent
Cherian et al.

(10) Patent No.: US 12,804,729 B2
(45) Date of Patent: Nov. 17, 2026

(54) SERVICE PERIOD BASED COORDINATED SPATIAL REUSE

(71) Applicant: QUALCOMM Incorporated, San Diego, CA (US)

(72) Inventors: George Cherian, San Diego, CA (US); Sameer Vermani, San Diego, CA (US); Alfred Asterjadhi, San Diego, CA (US); Abhishek Pramod Patil, San Diego, CA (US); Gaurang Naik, San Diego, CA (US); Sai Yiu Duncan Ho, San Diego, CA (US); Bin Tian, San Diego, CA (US); Ahmed Ragab Elsherif, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 245 days.

(21) Appl. No.: 18/904,622

(22) Filed: Oct. 2, 2024

(65) Prior Publication Data

US 2025/0126658 A1 Apr. 17, 2025

Related U.S. Application Data

(60) Provisional application No. 63/589,600, filed on Oct. 11, 2023.

(51) Int. Cl.
*H04W 74/0808* (2024.01)
*H04W 52/24* (2009.01)
(Continued)

(52) U.S. Cl.
CPC ....... *H04W 74/085* (2013.01); *H04W 52/243* (2013.01); *H04W 84/12* (2013.01)

(58) Field of Classification Search
None
See application file for complete search history.

(56) References Cited

U.S. PATENT DOCUMENTS

2021/0345296 A1* 11/2021 Yang ..................... H04L 5/0078
2021/0400717 A1* 12/2021 Han .................... H04W 52/243
(Continued)

FOREIGN PATENT DOCUMENTS

WO WO-2021086840 A1 5/2021

OTHER PUBLICATIONS

Guo J.Y., (Huawei Technologies Co Ltd) et al., "Coordinated Spatial Reuse Operation", IEEE Draft, 11-20-0033-01-00BE-Coordinated-Spatial-Reuse-Operation, IEEE-SA Mentor, Piscataway, NJ USA, vol. 802.11 EHT, 802.11be, No. 1, Feb. 6, 2020, pp. 1-14, XP068165614, p. 2-p. 11.

(Continued)

*Primary Examiner* — Sai Aung
(74) *Attorney, Agent, or Firm* — Holland & Hart LP/Qualcomm

(57) ABSTRACT

This disclosure provides methods, components, devices and systems for service period based coordinated spatial reuse. Some aspects relate to long term signaling to reduce the amount of signaling while achieving the gain associated with coordinated spatial reuse as compared to distributed spatial reuse. A first wireless device associated with a first basic service set (BSS) may transmit a beacon indicating a set of service periods designated for spatial reuse and an interference threshold. A second wireless device associated with a second BSS may receive the beacon and may communicate with one or more other wireless devices associated with the second BSS during the set of service periods designated for spatial reuse in accordance with the indicated interference threshold. Accordingly, the wireless devices in the second BSS may communicate at a power level that causes an acceptable level of interference at the first BSS.

20 Claims, 14 Drawing Sheets

(51) Int. Cl.

| | |
|---|---|
| ***H04W 72/02*** | (2009.01) |
| ***H04W 74/0833*** | (2024.01) |
| *H04W 84/12* | (2009.01) |

(56) References Cited

U.S. PATENT DOCUMENTS

| | | | | |
|---|---|---|---|---|
| 2022/0061058 | A1* | 2/2022 | Weissman | H04W 72/541 |
| 2022/0070924 | A1* | 3/2022 | Choi | H04L 5/0037 |
| 2023/0032794 | A1* | 2/2023 | Liu | H04J 13/0029 |
| 2023/0090167 | A1* | 3/2023 | Wang | H04W 24/08<br>370/252 |
| 2026/0164421 | A1* | 6/2026 | Huang | H04B 7/0617 |

OTHER PUBLICATIONS

International Search Report and Written Opinion—PCT/US2024/049836—ISA/EPO—Jan. 16, 2025 (2400147WO).

Seok Y., et al., "Coordinated Spatial Reuse Protocol", 11-20-0576-01-00be-Coordinated-Spatial-Reuse-Protocol, SA Mentor, Piscataway, NJ USA, vol. 802.11 EHT, 802.11be, No. 1, May 7, 2020, pp. 1-35, Apr. 2020, XP068172774, p. 4-p. 13.

* cited by examiner

SERVICE PERIOD BASED COORDINATED SPATIAL REUSE

PRIORITY INFORMATION

The present Application for Patent claims priority under 35 U.S.C. § 119 to U.S. Provisional Patent Application No. 63/589,600, by Cherian et al., filed Oct. 11, 2023 and entitled "SERVICE PERIOD BASED COORDINATED SPATIAL REUSE," which is assigned to the assignee hereof, and hereby expressly incorporated by reference herein.

TECHNICAL FIELD

This disclosure relates to wireless communication and, more specifically, to service period based coordinated spatial reuse.

DESCRIPTION OF THE RELATED TECHNOLOGY

A wireless local area network (WLAN) may be formed by one or more wireless access points (APs) that provide a shared wireless communication medium for use by multiple client devices also referred to as wireless stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

SUMMARY

The systems, methods, and devices of this disclosure each have several innovative aspects, no single one of which is solely responsible for the desirable attributes disclosed herein.

One innovative aspect of the subject matter described in this disclosure can be implemented in a first wireless device associated with a first BSS for wireless communications. The first wireless device may include a processing system that includes processor circuitry and memory circuitry that stores code. The processing system may be configured to cause the first wireless device to transmit, to a second wireless device associated with a second BSS, a first control message indicating one or more service periods designated for spatial reuse or one or more transmission opportunities (TXOPs) designated for spatial reuse and an interference threshold associated with the one or more service periods or the one or more TXOPs, transmit, during a first service period of the one or more service periods or during a first TXOP of the one or more TXOPs, a second control message to one or more third wireless devices associated with the first BSS, the second control message includes an indication of service for the one or more third wireless devices, and communicate, during the first service period or during the first TXOP, with the one or more third wireless devices, where respective transmission powers of the communication are in accordance with the interference threshold.

Another innovative aspect of the subject matter described in this disclosure can be implemented in a method for wireless communications by a first wireless device associated with a first basic service set (BSS). The method may include transmitting, to a second wireless device associated with a second BSS, a first control message indicating one or more service periods designated for spatial reuse or one or more TXOPs designated for spatial reuse and an interference threshold associated with the one or more service periods or the one or more TXOPs, transmitting, during a first service period of the one or more service periods or during a first TXOP of the one or more TXOPs, a second control message to one or more third wireless devices associated with the first BSS, the second control message includes an indication of service for the one or more third wireless devices, and communicating, during the first service period or during the first TXOP, with the one or more third wireless devices, where respective transmission powers of the communication are in accordance with the interference threshold.

Another innovative aspect of the subject matter described in this disclosure can be implemented in a first wireless device associated with a first BSS for wireless communications. The first wireless device may include means for transmitting, to a second wireless device associated with a second BSS, a first control message indicating one or more service periods designated for spatial reuse or one or more TXOPs designated for spatial reuse and an interference threshold associated with the one or more service periods or the one or more TXOPs, means for transmitting, during a first service period of the one or more service periods or during a first TXOP of the one or more TXOPs, a second control message to one or more third wireless devices associated with the first BSS, the second control message includes an indication of service for the one or more third wireless devices, and means for communicating, during the first service period or during the first TXOP, with the one or more third wireless devices, where respective transmission powers of the communication are in accordance with the interference threshold.

Another innovative aspect of the subject matter described in this disclosure can be implemented in a non-transitory computer-readable medium storing code for wireless communication. The code may include instructions executable by a processor to transmit, to a second wireless device associated with a second BSS, a first control message indicating one or more service periods designated for spatial reuse or one or more TXOPs designated for spatial reuse and an interference threshold associated with the one or more service periods or the one or more TXOPs, transmit, during a first service period of the one or more service periods or during a first TXOP of the one or more TXOPs, a second control message to one or more third wireless devices associated with the first BSS, the second control message includes an indication of service for the one or more third wireless devices, and communicate, during the first service period or during the first TXOP, with the one or more third wireless devices, where respective transmission powers of the communication are in accordance with the interference threshold.

In some examples of the method, first wireless device, and non-transitory computer-readable medium described herein, transmitting the second control message may include operations, features, means, or instructions for transmitting a multi-user request to send message, where communicating with the one or more third wireless devices includes transmitting one or more respective downlink data communications to the one or more third wireless devices.

In some examples of the method, first wireless device, and non-transitory computer-readable medium described herein, transmitting the second control message may include operations, features, means, or instructions for transmitting an uplink grant to the one or more third wireless devices, where communicating with the one or more third wireless devices includes receiving one or more respective uplink data communications from the one or more third wireless devices.

Another innovative aspect of the subject matter described in this disclosure can be implemented in a second wireless device associated with a second BSS for wireless communications. The second wireless device may include a processing system that includes processor circuitry and memory circuitry that stores code. The processing system may be configured to cause the second wireless device to receive, from a first wireless device associated with a first BSS, a first control message indicating one or more service periods designated for spatial reuse or one or more TXOPs designated for spatial reuse and an interference threshold associated with the one or more service periods or the one or more TXOPs designated for spatial reuse, receive, from the first wireless device during a first service period of the one or more service periods or during a first TXOP of the one or more TXOPs, a second control message, and communicate, during the first service period or during the first TXOP, with one or more third wireless devices, where respective transmission powers of the communication are in accordance with the interference threshold and a pathloss associated with the second control message.

Another innovative aspect of the subject matter described in this disclosure can be implemented in a method for wireless communications by a second wireless device associated with a second BSS. The method may include receiving, from a first wireless device associated with a first BSS, a first control message indicating one or more service periods designated for spatial reuse or one or more TXOPs designated for spatial reuse and an interference threshold associated with the one or more service periods or the one or more TXOPs designated for spatial reuse, receiving, from the first wireless device during a first service period of the one or more service periods or during a first TXOP of the one or more TXOPs, a second control message, and communicating, during the first service period or during the first TXOP, with one or more third wireless devices, where respective transmission powers of the communication are in accordance with the interference threshold and a pathloss associated with the second control message.

Another innovative aspect of the subject matter described in this disclosure can be implemented in a second wireless device associated with a second BSS for wireless communications. The second wireless device may include means for receiving, from a first wireless device associated with a first BSS, a first control message indicating one or more service periods designated for spatial reuse or one or more TXOPs designated for spatial reuse and an interference threshold associated with the one or more service periods or the one or more TXOPs designated for spatial reuse, means for receiving, from the first wireless device during a first service period of the one or more service periods or during a first TXOP of the one or more TXOPs, a second control message, and means for communicating, during the first service period or during the first TXOP, with one or more third wireless devices, where respective transmission powers of the communication are in accordance with the interference threshold and a pathloss associated with the second control message.

Another innovative aspect of the subject matter described in this disclosure can be implemented in a non-transitory computer-readable medium storing code for wireless communications. The code may include instructions executable by a processor to receive, from a first wireless device associated with a first BSS, a first control message indicating one or more service periods designated for spatial reuse or one or more TXOPs designated for spatial reuse and an interference threshold associated with the one or more service periods or the one or more TXOPs designated for spatial reuse, receive, from the first wireless device during a first service period of the one or more service periods or during a first TXOP of the one or more TXOPs, a second control message, and communicate, during the first service period or during the first TXOP, with one or more third wireless devices, where respective transmission powers of the communication are in accordance with the interference threshold and a pathloss associated with the second control message.

Some examples of the method, second wireless device, and non-transitory computer-readable medium described herein may further include operations, features, means, or instructions for receiving one or more respective clear to send (CTS) messages from one or more fourth wireless devices associated with the first BSS, where the second control message may be a multi-user request to send message, and where the one or more respective CTS messages may be responsive to the multi-user request to send message, where the pathloss associated with the second control message may be identified from one or more respective pathlosses associated with the one or more respective CTS messages, and where communicating with the one or more third wireless devices includes transmitting one or more respective downlink data communications to the one or more third wireless devices.

Some examples of the method, second wireless device, and non-transitory computer-readable medium described herein may further include operations, features, means, or instructions for measuring one or more respective received signal strength indicators (RSSIs) of the one or more respective CTS messages, where the one or more respective pathlosses may be associated with the one or more respective RSSIs and a reference transmission power indicated in the first control message.

Some examples of the method, second wireless device, and non-transitory computer-readable medium described herein may further include operations, features, means, or instructions for receiving, from the first wireless device, an uplink grant for one or more fourth wireless devices associated with the first BSS, where the second control message may be the uplink grant and forwarding, to the one or more third wireless devices, the uplink grant.

Some examples of the method, second wireless device, and non-transitory computer-readable medium described herein may further include operations, features, means, or instructions for measuring a transmission power of the second control message, where the pathloss associated with the second control message may be associated with the transmission power and transmitting, to the one or more third wireless devices, a maximum transmission power for the first service period in accordance with the transmission power and the interference threshold, where communicating with the one or more third wireless devices includes receiving one or more respective uplink data communications from the one or more third wireless devices, and where the respective transmission powers of the communication may be less than or equal to the maximum transmission power.

Some examples of the method, second wireless device, and non-transitory computer-readable medium described herein may further include operations, features, means, or instructions for transmitting, to the one or more third wireless devices, a third control message in response to the first control message and prior to the first service period, the third control message indicating the one or more service periods designated for spatial reuse.

Another innovative aspect of the subject matter described in this disclosure can be implemented in a third wireless device associated with a second BSS for wireless communications. The third wireless device may include a processing system that includes processor circuitry and memory circuitry that stores code. The processing system may be configured to cause the third wireless device to receive, from a second wireless device associated with the second BSS, a first control message indicating one or more service periods designated for spatial reuse or one or more TXOPs designated for spatial reuse with a first wireless device associated with a first BSS and an interference threshold associated with the one or more service periods designated for spatial reuse and communicate with the second wireless device during a first service period of the one or more service periods or during a first TXOP of the one or more TXOPs, where a transmission power of the communication is in accordance with the interference threshold.

Another innovative aspect of the subject matter described in this disclosure can be implemented in a method for wireless communications by a third wireless device. The method may include receiving, from a second wireless device associated with the second BSS, a first control message indicating one or more service periods designated for spatial reuse or one or more TXOPs designated for spatial reuse with a first wireless device associated with a first BSS and an interference threshold associated with the one or more service periods or the one or more TXOPs designated for spatial reuse and communicating with the second wireless device during a first service period of the one or more service periods or during a first TXOP of the one or more TXOPs, where a transmission power of the communication is in accordance with the interference threshold.

Another innovative aspect of the subject matter described in this disclosure can be implemented in a third wireless device associated with a second BSS for wireless communications. The third wireless device may include means for receiving, from a second wireless device associated with the second BSS, a first control message indicating one or more service periods designated for spatial reuse or one or more TXOPs designated for spatial reuse with a first wireless device associated with a first BSS and an interference threshold associated with the one or more service periods or the one or more TXOPs designated for spatial reuse and means for communicating with the second wireless device during a first service period of the one or more service periods or during a first TXOP of the one or more TXOPs, where a transmission power of the communication is in accordance with the interference threshold.

Another innovative aspect of the subject matter described in this disclosure can be implemented in a non-transitory computer-readable medium storing code for wireless communications is described. The code may include instructions executable by a processor to receive, from a second wireless device associated with the second BSS, a first control message indicating one or more service periods designated for spatial reuse or one or more TXOPs designated for spatial reuse with a first wireless device associated with a first BSS and an interference threshold associated with the one or more service periods or the one or more TXOPs designated for spatial reuse and communicate with the second wireless device during a first service period of the one or more service periods or during a first TXOP of the one or more TXOPs, where a transmission power of the communication is in accordance with the interference threshold.

Some examples of the method, third wireless device, and non-transitory computer-readable medium described herein may further include operations, features, means, or instructions for receiving, during the first service period, a forwarded uplink grant from the first wireless device for one or more fourth wireless devices associated with the first BSS, where the transmission power may be associated with the forwarded uplink grant, and where communicating with the second wireless device includes transmitting an uplink communication to the second wireless device.

Some examples of the method, third wireless device, and non-transitory computer-readable medium described herein may further include operations, features, means, or instructions for measuring a RSSI of the forwarded uplink grant, where the transmission power may be determined in accordance with the RSSI.

Some examples of the method, third wireless device, and non-transitory computer-readable medium described herein may further include operations, features, means, or instructions for receiving, from the second wireless device during the first service period, a second control message indicating maximum transmission power for the first service period, where communicating with the second wireless device includes transmitting an uplink communication to the second wireless device, and where the transmission power may be less than or equal to the maximum transmission power.

In some examples of the method, third wireless device, and non-transitory computer-readable medium described herein, communicating with the second wireless device may include operations, features, means, or instructions for receiving a downlink data communication.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
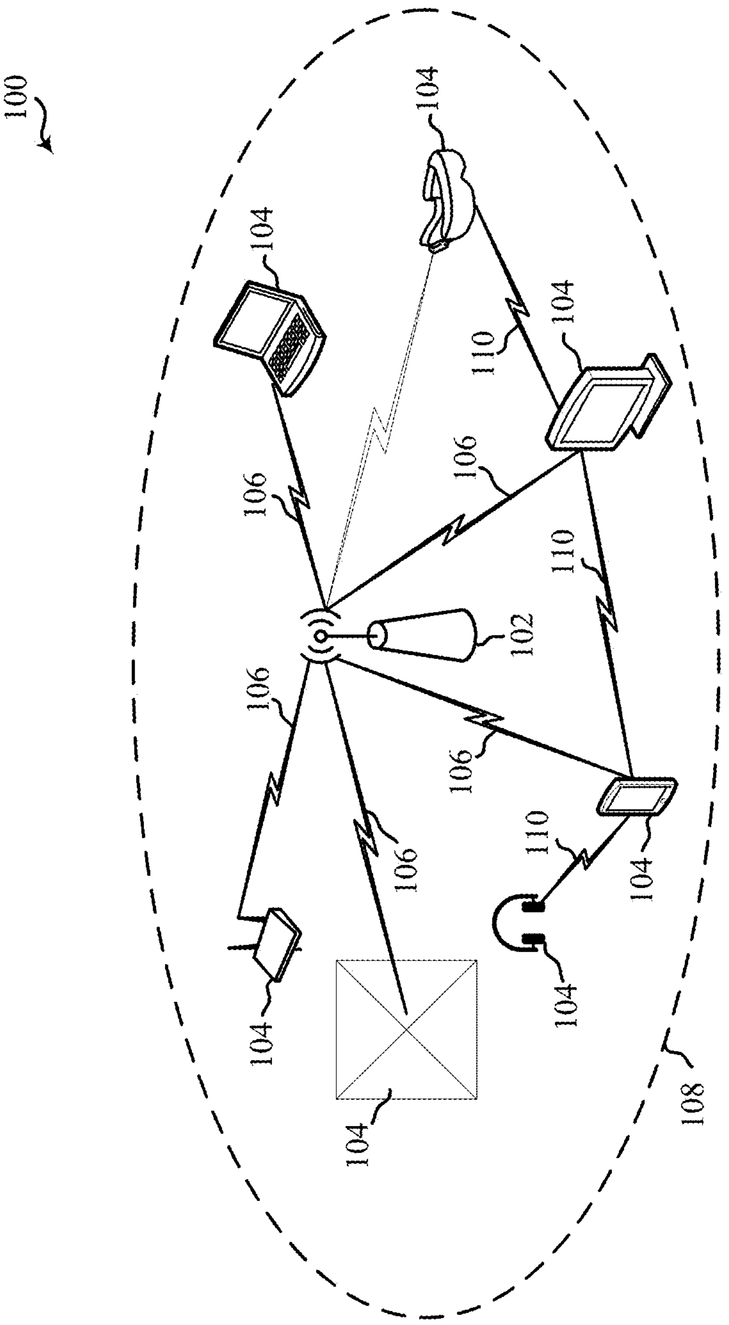
FIG. 1 shows a pictorial diagram of an example wireless communication network.

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described examples can be implemented in any device, system or network that is capable of transmitting and receiving RF signals according to one or more of the following technologies or techniques: code division multiple access (CDMA), time division multiple access (TDMA), orthogonal frequency division multiplexing (OFDM), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO (MU-MIMO). The described examples also can be implemented using other wireless communication protocols or RF signals suitable for use in one or more of a wireless personal area network (WPAN), a wireless local area network (WLAN), a wireless wide area network (WWAN), a wireless metropolitan area network (WMAN), or an internet of things (IOT) network.

Various aspects relate generally to coordinated spatial reuse between basic service sets (BSSs). Some aspects more specifically relate to one or more configuration- or signaling-based mechanisms according to which a first wireless device associated with a first BSS may advertise a set of one or more service periods designated for spatial reuse and an interference threshold associated with the set of one or more service periods designated for spatial reuse. A second wireless device associated with a second BSS may receive the advertisement and communicate with one or more other wireless devices (such as one or more third wireless devices) associated with the second BSS during the indicated set of service periods in accordance with the indicated interference threshold. Accordingly, the wireless devices associated with the first BSS and the wireless devices associated with the second BSS may communicate using the same resources during the set of one or more service periods designated for spatial reuse, but the wireless devices associated with the second BSS may limit their transmit power to levels that produce acceptable amounts of interference to the wireless devices associated with the first BSS.

In some examples, the first wireless device associated with the first BSS may communicate with multiple client wireless devices associated with the first BSS. The first wireless device may partition the client wireless devices into a set of one or more client devices associated with a relatively higher signal strength (such as a set of one or more fourth wireless devices having a signal to interference and noise ratio (SINR) that falls above a defined threshold) and another set of one or more wireless devices associated with a relatively lower signal strength (such as a set of one or more fifth wireless devices having an SINR that falls below the defined threshold). The first wireless device may communicate with the one or more client devices associated with the relatively higher signal strength during the service periods designated for spatial reuse, and with the one or more client devices associated with the relatively lower signal strength during one or more other service periods that are orthogonal to the service periods designated for spatial reuse. For example, the first wireless device may consider or classify the one or more client devices associated with the relatively higher signal strength as "inner zone" client devices or "inner client devices" and consider or classify the one or more wireless devices associated with the relatively lower signal strength as being "outer zone" client devices or "outer client devices."

Particular aspects of the subject matter described in this disclosure can be implemented to realize one or more of the following potential advantages. In some examples, by signaling the interference threshold for a set of multiple service periods, a first wireless device associated with a first BSS may enable coordinated spatial reuse between wireless devices in the first BSS and a second BSS without the high signaling overhead associated with coordinating transmission powers for each service period or transmission opportunity (TXOP). The signaling of the interference threshold may allow the wireless devices associated with the second BSS to identify allowable transmission powers for each of the service periods designated for spatial reuse that will keep interference at wireless devices associated with the first BSS within an acceptable level indicated by the interference threshold. For example, when a transmission by a wireless device in the second BSS during a service period designated for spatial reuse results in interference at a receiving device in the first BSS being less than or equal to the signaled interference threshold, then the interference level is acceptable. When a transmission by a wireless device in the second BSS during a service period designated for spatial reuse results in interference at a receiving device in the first BSS being greater than the signaled interference threshold, then the interference level is not acceptable. Additionally, by grouping client wireless devices of the first BSS into separate sets of high signal strength devices (such as inner zone client devices) and low signal strength devices (such as outer zone client devices), and communicating with the high signal strength devices during the service periods designated for spatial reuse, the first wireless device may substantially reduce the impact of interference from outside of the first BSS during the service periods designated for spatial reuse, resulting in better power efficiency, higher data rates, increased spectral efficiency, and greater system capacity.

FIG. 1 shows a pictorial diagram of an example wireless communication network 100. According to some aspects, the wireless communication network 100 can be an example of a wireless local area network (WLAN) such as a Wi-Fi network. For example, the wireless communication network 100 can be a network implementing at least one of the IEEE 802.11 family of wireless communication protocol standards (such as defined by the IEEE 802.11-2020 specification or amendments thereof including, but not limited to, 802.11ay, 802.11ax, 802.11az, 802.11ba, 802.11bd, 802.11be, 802.11bf, and 802.11bn). In some other examples, the wireless communication network 100 can be an example of a cellular radio access network (RAN), such as a 5G or 6G RAN that implements one or more cellular protocols such as those specified in one or more 3GPP standards. In some other examples, the wireless communication network 100 can include a WLAN that functions in an interoperable or converged manner with one or more cellular RANs to provide greater or enhanced network coverage to wireless communication devices within the wireless communication network 100 or to enable such devices to connect to a cellular network's core, such as to access the network management capabilities and functionality offered by the cellular network core.

The wireless communication network 100 may include numerous wireless communication devices including at least one wireless access point (AP) 102 and any number of wireless stations (STAs) 104. While only one AP 102 is shown in FIG. 1, the wireless communication network 100 can include multiple APs 102. The AP 102 can be or represent various different types of network entities including, but not limited to, a home networking AP, an enterprise-level AP, a single-frequency AP, a dual-band simultaneous (DBS) AP, a tri-band simultaneous (TBS) AP, a standalone AP, a non-standalone AP, a software-enabled AP (soft AP), and a multi-link AP (also referred to as an AP multi-link device (MLD)), as well as cellular (such as 3GPP, 4G LTE, 5G or 6G) base stations or other cellular network nodes such as a Node B, an evolved Node B (eNB), a gNB, a transmission reception point (TRP) or another type of device or equipment included in a radio access network (RAN), including Open-RAN (O-RAN) network entities, such as a central unit (CU), a distributed unit (DU) or a radio unit (RU).

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, other handheld or wearable communication devices, netbooks, notebook computers, tablet computers, laptops, Chromebooks, augmented reality (AR), virtual reality (VR), mixed reality (MR) or extended reality (XR) wireless headsets or other peripheral devices, wireless earbuds, other wearable devices, display devices (for example, TVs, computer monitors or video gaming consoles), video game controllers, navigation systems, music or other audio or stereo devices, remote control devices, printers, kitchen appliances (including smart refrigerators) or other household appliances, key fobs (for example, for passive keyless entry and start (PKES) systems), Internet of Things (IoT) devices, and vehicles, among other examples.

A single AP 102 and an associated set of STAs 104 may be referred to as a BSS, which is managed by the respective AP 102. FIG. 1 additionally shows an example coverage area 108 of the AP 102, which may represent a basic service area (BSA) of the wireless communication network 100. The BSS may be identified by STAs 104 and other devices by a service set identifier (SSID), as well as a basic service set identifier (BSSID), which may be a medium access control (MAC) address of the AP 102. The AP 102 may periodically broadcast beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification or indication of a primary channel used by the respective AP 102 as well as a timing synchronization function (TSF) for establishing or maintaining timing synchronization with the AP 102. The AP 102 may provide access to external networks to various STAs 104 in the wireless communication network 100 via respective communication links 106.

To establish a communication link 106 with an AP 102, each of the STAs 104 is configured to perform passive or active scanning operations ("scans") on frequency channels in one or more frequency bands (for example, the 2.4 GHz, 5 GHz, 6 GHz, 45 GHz, or 60 GHz bands). To perform passive scanning, a STA 104 listens for beacons, which are transmitted by respective APs 102 at periodic time intervals referred to as target beacon transmission times (TBTTs). To perform active scanning, a STA 104 generates and sequentially transmits probe requests on each channel to be scanned and listens for probe responses from APs 102. Each STA 104 may identify, determine, ascertain, or select an AP 102 with which to associate in accordance with the scanning information obtained through the passive or active scans, and to perform authentication and association operations to establish a communication link 106 with the selected AP 102. The selected AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA 104 or to select among multiple APs 102 that together form an extended service set (ESS) including multiple connected BSSs. For example, the wireless communication network 100 may be connected to a wired or wireless distribution system that may enable multiple APs 102 to be connected in such an ESS. As such, a STA 104 can be covered by more than one AP 102 and can associate with different APs 102 at different times for different transmissions. Additionally, after association with an AP 102, a STA 104 also may periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some examples, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some examples, ad hoc networks may be implemented within a larger network such as the wireless communication network 100. In such examples, while the STAs 104 may be capable of communicating with each other through the AP 102 using communication links 106, STAs 104 also can communicate directly with each other via direct wireless communication links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless communication links 110 include Wi-Fi Direct connections, connections established by using a Wi-Fi Tunneled Direct Link Setup (TDLS) link, and other P2P group connections.

In some networks, the AP 102 or the STAs 104, or both, may support applications associated with high throughput or low-latency requirements, or may provide lossless audio to one or more other devices. For example, the AP 102 or the STAs 104 may support applications and use cases associated with ultra-low-latency (ULL), such as ULL gaming, or streaming lossless audio and video to one or more personal audio devices (such as peripheral devices) or AR/VR/MR/XR headset devices. In scenarios in which a user uses two or more peripheral devices, the AP 102 or the STAs 104 may support an extended personal audio network enabling communication with the two or more peripheral devices. Additionally, the AP 102 and STAs 104 may support additional ULL applications such as cloud-based applications (such as VR cloud gaming) that have ULL and high throughput requirements.

As indicated above, in some implementations, the AP 102 and the STAs 104 may function and communicate (via the respective communication links 106) according to one or more of the IEEE 802.11 family of wireless communication protocol standards. These standards define the WLAN radio and baseband protocols for the physical (PHY) and MAC layers. The AP 102 and STAs 104 transmit and receive wireless communications (hereinafter also referred to as "Wi-Fi communications" or "wireless packets") to and from one another in the form of PHY protocol data units (PPDUs).

Each PPDU is a composite structure that includes a PHY preamble and a payload that is in the form of a PHY service data unit (PSDU). The information provided in the preamble may be used by a receiving device to decode the subsequent data in the PSDU. In instances in which a PPDU is transmitted over a bonded or wideband channel, the preamble fields may be duplicated and transmitted in each of multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is associated with the particular IEEE 802.11 wireless communication protocol to be used to transmit the payload.

The APs 102 and STAs 104 in the wireless communication network 100 may transmit PPDUs over an unlicensed spectrum, which may be a portion of spectrum that includes frequency bands traditionally used by Wi-Fi technology, such as the 2.4 GHz, 5 GHz, 6 GHz, 45 GHz, and 60 GHz bands. Some examples of the APs 102 and STAs 104 described herein also may communicate in other frequency bands that may support licensed or unlicensed communications. For example, the APs 102 or STAs 104, or both, also may be capable of communicating over licensed operating bands, where multiple operators may have respective licenses to operate in the same or overlapping frequency ranges. Such licensed operating bands may map to or be associated with frequency range designations of FR1 (410 MHz-7.125 GHz), FR2 (24.25 GHz-52.6 GHz), FR3 (7.125 GHz-24.25 GHz), FR4a or FR4-1 (52.6 GHz-71 GHz), FR4 (52.6 GHz-114.25 GHz), and FR5 (114.25 GHz-300 GHz).

Each of the frequency bands may include multiple subbands and frequency channels (also referred to as subchannels). For example, PPDUs conforming to the IEEE 802.11n, 802.11ac, 802.11ax, 802.11be and 802.11bn standard amendments may be transmitted over one or more of the 2.4 GHz, 5 GHz, or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 MHz, 240 MHz, 320 MHz, 480 MHz, or 640 MHz by bonding together multiple 20 MHz channels.

Puncturing is a wireless communication technique that enables a wireless communication device (such as an AP 102 or a STA 104) to transmit and receive wireless communications over a portion of a wireless channel exclusive of one or more particular subchannels (hereinafter also referred to as "punctured subchannels"). Puncturing specifically may be used to exclude one or more subchannels from the transmission of a PPDU, including the signaling of the preamble, to avoid interference from a static source, such as an incumbent system, or to avoid interference of a more dynamic nature such as that associated with transmissions by other wireless communication devices in overlapping BSSs (OBSSs). The transmitting device (such as AP 102 or STA 104) may puncture the subchannels on which there is interference and in essence spread the data of the PPDU to cover the remaining portion of the bandwidth of the channel. For example, if a transmitting device determines (for example, detects, identifies, ascertains, or calculates), in association with a contention operation, that one or more 20 MHz subchannels of a wider bandwidth wireless channel are busy or otherwise not available, the transmitting device implement puncturing to avoid communicating over the unavailable subchannels while still utilizing the remaining portions of the bandwidth. Accordingly, puncturing enables a transmitting device to improve or maximize throughput, and in some instances reduce latency, by utilizing as much of the available spectrum as possible. Static puncturing in particular makes it possible to consistently use wideband channels in environments or deployments where there may be insufficient contiguous spectrum available, such as in the 5 GHz and 6 GHz bands.

In some examples, the AP 102 or the STAs 104 of the wireless communication network 100 may implement Extremely High Throughput (EHT) or other features compliant with current and future generations of the IEEE 802.11 family of wireless communication protocol standards (such as the IEEE 802.11be and 802.11bn standard amendments) to provide additional capabilities over other previous systems (for example, High Efficiency (HE) systems or other legacy systems).

In some examples, the AP 102 or the STA 104 may benefit from operability enhancements associated with EHT and newer generations of the IEEE 802.11 family of wireless communication protocol standards. For example, the AP 102 or the STA 104 attempting to gain access to the wireless medium of wireless communication network 100 may perform techniques (which may include modifications to existing rules, structure, or signaling implemented for legacy systems) such as clear channel assessment (CCA) operation based on EHT enhancements such as increased bandwidth, puncturing, or refinements to carrier sensing and signal reporting mechanisms.

Transmitting and receiving devices AP 102 and STA 104 may support the use of various modulation and coding schemes (MCSs) to transmit and receive data in the wireless communication network 100 so as to optimally take advantage of wireless channel conditions, for example, to increase throughput, reduce latency, or enforce various quality of service (QoS) parameters. For example, existing technology (such as IEEE 802.11ax standard amendment protocols) supports the use of up to 1024-QAM, where a modulated symbol carries 10 bits. To further improve peak data rate, each of the AP 102 or the STA 104 may employ use of 4096-QAM (also referred to as "4 k QAM"), which enables a modulated symbol to carry 12 bits. 4 k QAM may enable massive peak throughput with a maximum theoretical PHY rate of 10 bps/Hz/subcarrier/spatial stream, which translates to 23 Gbps with 5/6 LDPC code (10 bps/Hz/subcarrier/spatial stream*996*4 subcarriers*8 spatial streams/13.6 μs per OFDM symbol). The AP 102 or the STA 104 using 4096-QAM may enable a 20% increase in data rate compared to 1024-QAM given the same coding rate, thereby allowing users to obtain higher transmission efficiency.

Figure 2:
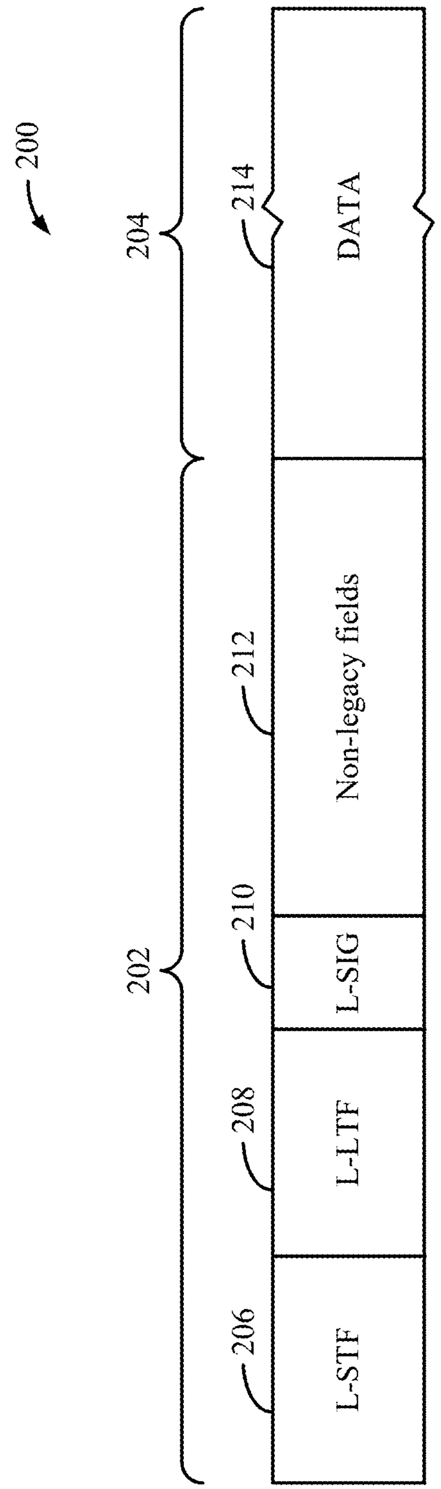
FIG. 2 shows an example protocol data unit (PDU) usable for communications between a wireless access point (AP) and one or more wireless stations (STAs).

FIG. 2 shows an example protocol data unit (PDU) 200 usable for wireless communication between a wireless AP and one or more wireless STAs. For example, the AP and STAs may be examples of the AP 102 and the STAs 104 described with reference to FIG. 1. The PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two symbols, a legacy long training field (L-LTF) 208, which may consist of two symbols, and a legacy signal field (L-SIG) 210, which may consist of two symbols. The legacy portion of the preamble 202 may be configured according to the IEEE 802.11a wireless communication protocol standard. The preamble 202 also may include a non-legacy portion including one or more non-legacy fields 212, for example, conforming to one or more of the IEEE 802.11 family of wireless communication protocol standards.

The L-STF 206 generally enables a receiving device (such as an AP 102 or a STA 104) to perform coarse timing and frequency tracking and automatic gain control (AGC). The L-LTF 208 generally enables the receiving device to perform fine timing and frequency tracking and also to perform an initial estimate of the wireless channel. The L-SIG 210 generally enables the receiving device to determine (for example, obtain, select, identify, detect, ascertain, calculate, or compute) a duration of the PDU and to use the determined duration to avoid transmitting on top of the PDU. The legacy portion of the preamble, including the L-STF 206, the L-LTF 208 and the L-SIG 210, may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of MAC protocol data units (MPDUs) or an aggregated MPDU (A-MPDU).

Figure 3:
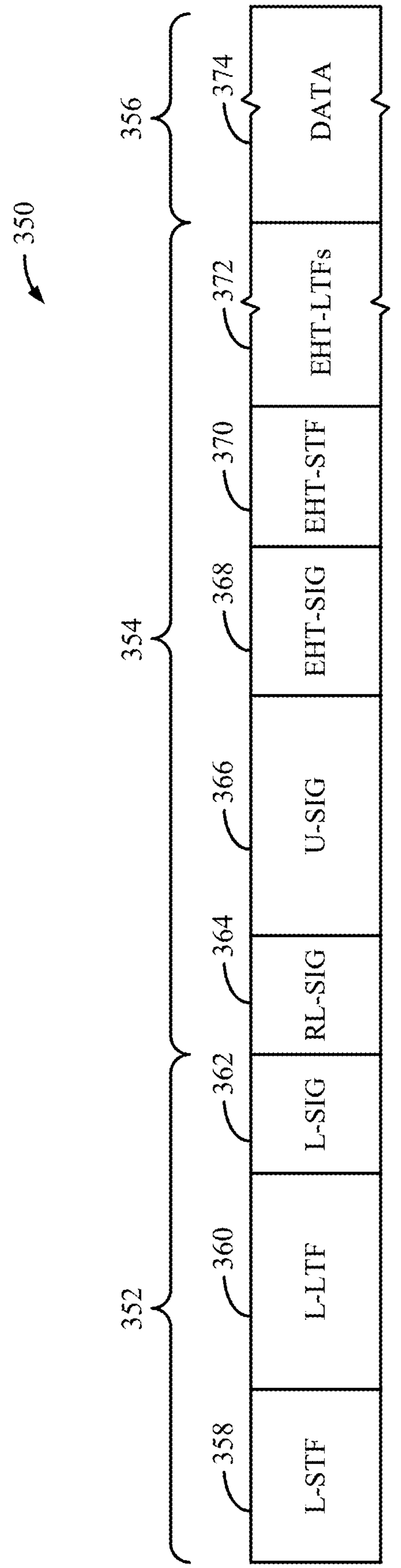
FIG. 3 shows an example physical layer (PHY) protocol data unit (PPDU) usable for communications between a wireless AP and one or more wireless STAs.

FIG. 3 shows an example physical layer (PHY) protocol data unit (PPDU) 350 usable for communications between a wireless AP and one or more wireless STAs. For example, the AP and STAs may be examples of the AP 102 and the STAs 104 described with reference to FIG. 1. As shown, the PPDU 350 includes a PHY preamble, that includes a legacy portion 352 and a non-legacy portion 354, and a payload 356 that includes a data field 374. The legacy portion 352 of the preamble includes an L-STF 358, an L-LTF 360, and an L-SIG 362. The non-legacy portion 354 of the preamble includes a repetition of L-SIG (RL-SIG) 364 and multiple wireless communication protocol version-dependent signal fields after RL-SIG 364. For example, the non-legacy portion 354 may include a universal signal field 366 (referred to herein as "U-SIG 366") and an EHT signal field 368 (referred to herein as "EHT-SIG 368"). The presence of RL-SIG 364 and U-SIG 366 may indicate to EHT- or later version-compliant STAs 104 that the PPDU 350 is an EHT PPDU or a PPDU conforming to any later (post-EHT) version of a new wireless communication protocol conforming to a future IEEE 802.11 wireless communication protocol standard. One or both of U-SIG 366 and EHT-SIG 368 may be structured as, and carry version-dependent information for, other wireless communication protocol versions associated with amendments to the IEEE family of standards beyond EHT. For example, U-SIG 366 may be used by a receiving device (such as the AP 102 or the STA 104) to interpret bits in one or more of EHT-SIG 368 or the data field 374. Like L-STF 358, L-LTF 360, and L-SIG 362, the information in U-SIG 366 and EHT-SIG 368 may be duplicated and transmitted in each of the component 20 MHz channels in instances involving the use of a bonded channel.

The non-legacy portion 354 further includes an additional short training field 370 (referred to herein as "EHT-STF 370," although it may be structured as, and carry version-dependent information for, other wireless communication protocol versions beyond EHT) and one or more additional long training fields 372 (referred to herein as "EHT-LTFs 372," although they may be structured as, and carry version-dependent information for, other wireless communication protocol versions beyond EHT). EHT-STF 370 may be used for timing and frequency tracking and AGC, and EHT-LTF 372 may be used for more refined channel estimation.

EHT-SIG 368 may be used by an AP 102 to identify and inform one or multiple STAs 104 that the AP 102 has scheduled uplink (UL) or downlink (DL) resources for them. EHT-SIG 368 may be decoded by each compatible STA 104 served by the AP 102. EHT-SIG 368 may generally be used by the receiving device to interpret bits in the data field 374. For example, EHT-SIG 368 may include resource unit (RU) allocation information, spatial stream configuration information, and per-user (for example, STA-specific) signaling information. Each EHT-SIG 368 may include a common field and at least one user-specific field. In the context of OFDMA, the common field can indicate RU distributions to multiple STAs 104, indicate the RU assignments in the frequency domain, indicate which RUs are allocated for MU-MIMO transmissions and which RUs correspond to OFDMA transmissions, and the number of users in allocations, among other examples. The user-specific fields are assigned to particular STAs 104 and carry STA-specific scheduling information such as user-specific MCS values and user-specific RU allocation information. Such information enables the respective STAs 104 to identify and decode corresponding RUs in the associated data field 374.

Figure 4:
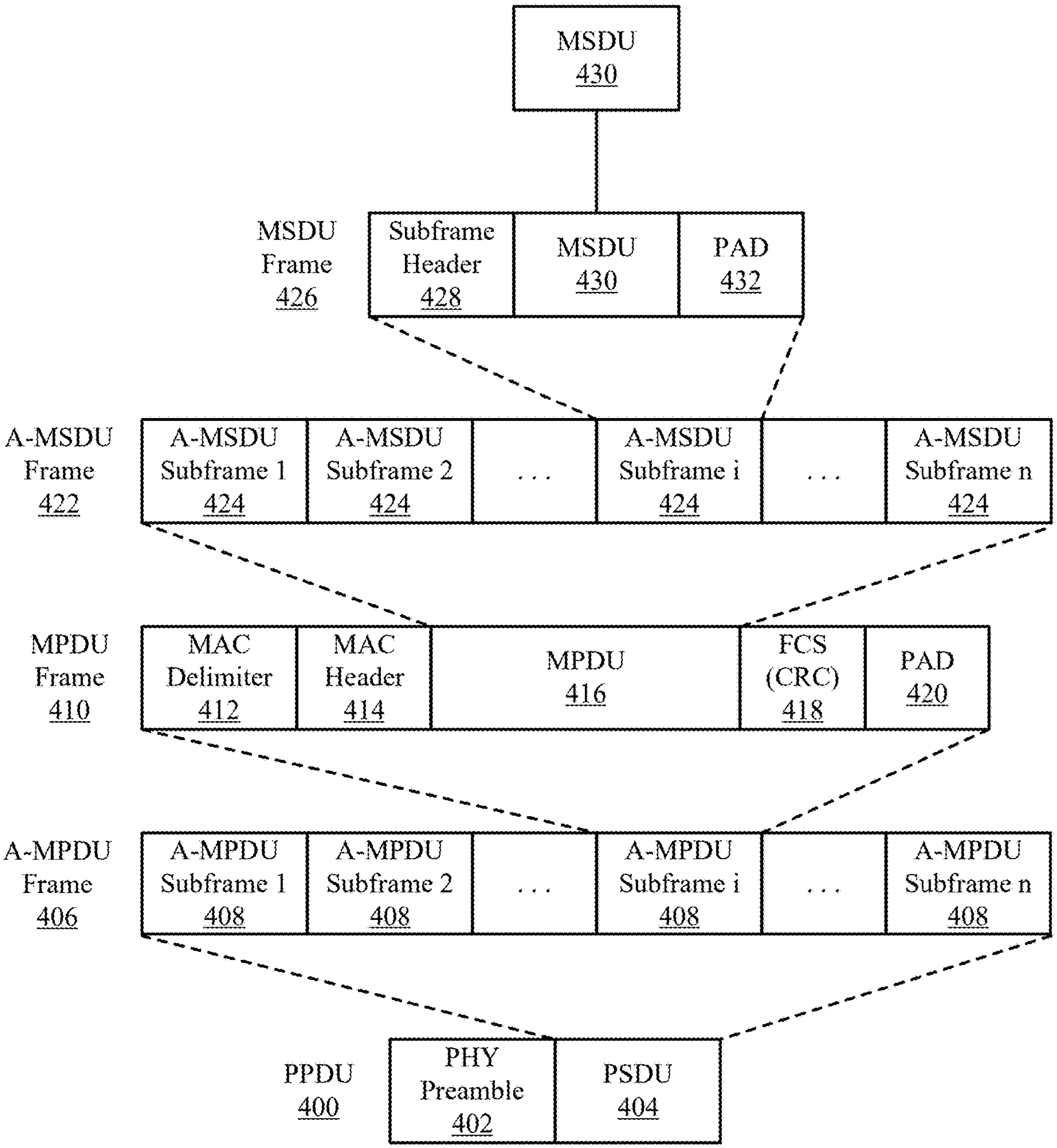
FIG. 4 shows a hierarchical format of an example PPDU usable for communications between a wireless AP and one or more wireless STAs.

FIG. 4 shows a hierarchical format of an example PPDU usable for communications between a wireless AP and one or more wireless STAs. For example, the AP and STAs may be examples of the AP 102 and the STAs 104 described with reference to FIG. 1. As described, each PPDU 400 includes a PHY preamble 402 and a PSDU 404. Each PSDU 404 may represent (or "carry") one or more MAC protocol data units (MPDUs) 416. For example, each PSDU 404 may carry an aggregated MPDU (A-MPDU) 406 that includes an aggregation of multiple A-MPDU subframes 408. Each A-MPDU subframe 406 may include an MPDU frame 410 that includes a MAC delimiter 412 and a MAC header 414 prior to the accompanying MPDU 416, which includes the data portion ("payload" or "frame body") of the MPDU frame 410. Each MPDU frame 410 also may include a frame check sequence (FCS) field 418 for error detection (for example, the FCS field may include a cyclic redundancy check (CRC)) and padding bits 420. The MPDU 416 may carry one or more MAC service data units (MSDUs) 416. For example, the MPDU 416 may carry an aggregated MSDU (A-MSDU) 422 including multiple A-MSDU subframes 424. Each A-MSDU subframe 424 (for example, MSDU frame 426) contains a corresponding MSDU 430 preceded by a subframe header 428 and in some cases followed by padding bits 432.

Referring back to the MPDU frame 410, the MAC delimiter 412 may serve as a marker of the start of the associated MPDU 416 and indicate the length of the associated MPDU 416. The MAC header 414 may include multiple fields containing information that defines or indicates characteristics or attributes of data encapsulated within the frame body of the MPDU 416. The MAC header 414 includes a duration field indicating a duration extending from the end of the PPDU until at least the end of an acknowledgment (ACK) or Block ACK (BA) of the PPDU that is to be transmitted by the receiving wireless communication device. The use of the duration field serves to reserve the wireless medium for the indicated duration, and enables the receiving device to establish its network allocation vector (NAV). The MAC header 414 also includes one or more fields indicating addresses for the data encapsulated within the frame body of the MPDU 416. For example, the MAC header 414 may include a combination of a source address, a transmitter address, a receiver address or a destination address. The MAC header 414 may further include a frame control field containing control information. The frame control field may specify a frame type, for example, a data frame, a control frame, or a management frame.

Access to the shared wireless medium is generally governed by a distributed coordination function (DCF). With a DCF, there is generally no centralized master device allocating time and frequency resources of the shared wireless medium. On the contrary, before a wireless communication device, such as an AP 102 or a STA 104, is permitted to transmit data, it may wait for a particular time and then contend for access to the wireless medium. The DCF is implemented through the use of time intervals (including the slot time (or "slot interval") and the inter-frame space (IFS). IFS provides priority access for control frames used for proper network operation. Transmissions may begin at slot boundaries. Different varieties of IFS exist including the short IFS (SIFS), the distributed IFS (DIFS), the extended IFS (EIFS), and the arbitration IFS (AIFS). The values for the slot time and IFS may be provided by a suitable standard specification, such as one or more of the IEEE 802.11 family of wireless communication protocol standards.

In some examples, the wireless communication device (such as the AP 102 or the STA 104) may implement the DCF through the use of carrier sense multiple access (CSMA) with collision avoidance (CA) (CSMA/CA) techniques. According to such techniques, before transmitting data, the wireless communication device may perform a clear channel assessment (CCA) and may determine (for example, identify, detect, ascertain, calculate, or compute) that the relevant wireless channel is idle. The CCA includes both physical (PHY-level) carrier sensing and virtual (MAC-level) carrier sensing. Physical carrier sensing is accomplished via a measurement of the received signal strength of a valid frame, which is then compared to a threshold to determine (for example, identify, detect, ascertain, calculate, or compute) whether the channel is busy. For example, if the received signal strength of a detected preamble is above a threshold, the medium is considered busy. Physical carrier sensing also includes energy detection. Energy detection involves measuring the total energy the wireless communication device receives regardless of whether the received signal represents a valid frame. If the total energy detected is above a threshold, the medium is considered busy.

Virtual carrier sensing is accomplished via the use of a network allocation vector (NAV), which effectively serves as a time duration that elapses before the wireless communication device may contend for access even in the absence of a detected symbol or even if the detected energy is below the relevant threshold. The NAV is reset each time a valid frame is received that is not addressed to the wireless communication device. When the NAV reaches 0, the wireless communication device performs the physical carrier sensing. If the channel remains idle for the appropriate IFS, the wireless communication device initiates a backoff timer, which represents a duration of time that the device senses the medium to be idle before it is permitted to transmit. If the channel remains idle until the backoff timer expires, the wireless communication device becomes the holder (or "owner") of a transmit opportunity (TXOP) and may begin transmitting. The TXOP is the duration of time the wireless communication device can transmit frames over the channel after it has "won" contention for the wireless medium. The TXOP duration may be indicated in the U-SIG field of a PPDU. If, on the other hand, one or more of the carrier sense mechanisms indicate that the channel is busy, a MAC controller within the wireless communication device will not permit transmission.

Each time the wireless communication device generates a new PPDU for transmission in a new TXOP, it randomly selects a new backoff timer duration. The available distribution of the numbers that may be randomly selected for the backoff timer is referred to as the contention window (CW). There are different CW and TXOP durations for each of the four access categories (ACs): voice (AC_VO), video (AC_VI), background (AC_BK), and best effort (AC_BE). This enables particular types of traffic to be prioritized in the network.

In some other examples, the wireless communication device (for example, the AP 102 or the STA 104) may contend for access to the wireless medium of the wireless communication network 100 in accordance with an enhanced distributed channel access (EDCA) procedure. A random channel access mechanism such as EDCA may afford high-priority traffic a greater likelihood of gaining medium access than low-priority traffic. The wireless communication device using EDCA may classify data into different access categories. Each AC may be associated with a different priority level and may be assigned a different range of random backoffs (RBOs) so that higher priority data is more likely to win a TXOP than lower priority data (such as by assigning lower RBOs to higher priority data and assigning higher RBOs to lower priority data). Although EDCA increases the likelihood that low-latency data traffic will gain access to a shared wireless medium during a given contention period, unpredictable outcomes of medium access contention operations may prevent low-latency applications from achieving certain levels of throughput or satisfying certain latency requirements.

Some APs and STAs (for example, the AP 102 and the STAs 104 described with reference to FIG. 1) may implement spatial reuse techniques. For example, APs 102 and STAs 104 configured for communications using the protocols defined in the IEEE 802.11ax or 802.11be standard amendments may be configured with a BSS color. APs 102 associated with different BSSs may be associated with different BSS colors. A BSS color is a numerical identifier of an AP 102's respective BSS (such as a 6 bit field carried by the SIG field). Each STA 104 may learn its own BSS color upon association with the respective AP 102. BSS color information is communicated at both the PHY and MAC sublayers. If an AP 102 or a STA 104 detects, obtains, selects, or identifies, a wireless packet from another wireless communication device while contending for access, the AP 102 or STA 104 may apply different contention parameters in accordance with whether the wireless packet is transmitted by, or transmitted to, another wireless communication device (such another AP 102 or STA 104) within its BSS or from a wireless communication device from an overlapping BSS (OBSS), as determined, identified, ascertained, or calculated by a BSS color indication in a preamble of the wireless packet. For example, if the BSS color associated with the wireless packet is the same as the BSS color of the AP 102 or STA 104, the AP 102 or STA 104 may use a first RSSI detection threshold when performing a CCA on the wireless channel. However, if the BSS color associated with the wireless packet is different than the BSS color of the AP 102 or STA 104, the AP 102 or STA 104 may use a second RSSI detection threshold in lieu of using the first RSSI detection threshold when performing the CCA on the wireless channel, the second RSSI detection threshold being greater than the first RSSI detection threshold. In this way, the criteria for winning contention are relaxed when interfering transmissions are associated with an OBSS.

Some APs and STAs (for example, the AP 102 and the STAs 104 described with reference to FIG. 1) may implement techniques for spatial reuse that involve participation in a coordinated communication scheme. According to such techniques, an AP 102 may contend for access to a wireless medium to obtain control of the medium for a TXOP. The AP that wins the contention (hereinafter also referred to as a "sharing AP") may select one or more other APs (hereinafter also referred to as "shared APs") to share resources of the TXOP. The sharing and shared APs may be located in proximity to one another such that at least some of their wireless coverage areas at least partially overlap. Some examples may specifically involve coordinated AP TDMA or OFDMA techniques for sharing the time or frequency resources of a TXOP. To share its time or frequency resources, the sharing AP may partition the TXOP into multiple time segments or frequency segments each including respective time or frequency resources representing a portion of the TXOP. The sharing AP may allocate the time or frequency segments to itself or to one or more of the shared APs. For example, each shared AP may utilize a partial TXOP assigned by the sharing AP for its uplink or downlink communications with its associated STAs.

In some examples of such TDMA techniques, each portion of a plurality of portions of the TXOP includes a set of time resources that do not overlap with any time resources of any other portion of the plurality of portions of the TXOP. In such examples, the scheduling information may include an indication of time resources, of multiple time resources of the TXOP, associated with each portion of the TXOP. For example, the scheduling information may include an indication of a time segment of the TXOP such as an indication of one or more slots or sets of symbol periods associated with each portion of the TXOP such as for multi-user TDMA.

In some examples of OFDMA techniques, each portion of the plurality of portions of the TXOP includes a set of frequency resources that do not overlap with any frequency resources of any other portion of the plurality of portions. In such examples, the scheduling information may include an indication of frequency resources, of multiple frequency resources of the TXOP, associated with each portion of the TXOP. For example, the scheduling information may include an indication of a bandwidth portion of the wireless channel such as an indication of one or more subchannels or resource units associated with each portion of the TXOP such as for multi-user OFDMA.

In this manner, the sharing AP's acquisition of the TXOP enables communication between one or more additional shared APs and their respective BSSs, subject to appropriate power control and link adaptation. For example, the sharing AP may limit the transmit powers of the selected shared APs such that interference from the selected APs does not prevent STAs associated with the TXOP owner from successfully decoding packets transmitted by the sharing AP. Such techniques may be used to reduce latency because the other APs may not need to wait to win contention for a TXOP to be able to transmit and receive data according to conventional CSMA/CA or enhanced distributed channel access (EDCA) techniques. Additionally, by enabling a group of APs 102 associated with different BSSs to participate in a coordinated AP transmission session, during which the group of APs may share at least a portion of a single TXOP obtained by any one of the participating APs, such techniques may increase throughput across the BSSs associated with the participating APs and also may achieve improvements in throughput fairness. Furthermore, with appropriate selection of the shared APs and the scheduling of their respective time or frequency resources, medium utilization may be maximized or otherwise increased while packet loss resulting from OBSS interference is minimized or otherwise reduced. Various implementations may achieve these and other advantages without requiring that the sharing AP or the shared APs be aware of the STAs 104 associated with other BSSs, without requiring a preassigned or dedicated master AP or preassigned groups of APs, and without requiring backhaul coordination between the APs participating in the TXOP.

In some examples in which the signal strengths or levels of interference associated with the selected APs are relatively low (such as less than a given value), or when the decoding error rates of the selected APs are relatively low (such as less than a threshold), the start times of the communications among the different BSSs may be synchronous. Conversely, when the signal strengths or levels of interference associated with the selected APs are relatively high (such as greater than the given value), or when the decoding error rates of the selected APs are relatively high (such as greater than the threshold), the start times may be offset from one another by a time period associated with decoding the preamble of a wireless packet and determining, from the decoded preamble, whether the wireless packet is an intra-BSS packet or is an OBSS packet. For example, the time period between the transmission of an intra-BSS packet and the transmission of an OBSS packet may allow a respective AP (or its associated STAs) to decode the preamble of the wireless packet and obtain the BSS color value carried in the wireless packet to determine whether the wireless packet is an intra-BSS packet or an OBSS packet. In this manner, each of the participating APs and their associated STAs may be able to receive and decode intra-BSS packets in the presence of OBSS interference.

In some examples, the sharing AP may perform polling of a set of un-managed or non-co-managed APs that support coordinated reuse to identify candidates for future spatial reuse opportunities. For example, the sharing AP may transmit one or more spatial reuse poll frames as part of determining one or more spatial reuse criteria and selecting one or more other APs to be shared APs. According to the polling, the sharing AP may receive responses from one or more of the polled APs. In some specific examples, the sharing AP may transmit a coordinated AP TXOP indication (CTI) frame to other APs that indicates time and frequency of resources of the TXOP that can be shared. The sharing AP may select one or more candidate APs upon receiving a coordinated AP TXOP request (CTR) frame from a respective candidate AP that indicates a desire by the respective AP to participate in the TXOP. The poll responses or CTR frames may include a power indication, for example, a receive (RX) power or RSSI measured by the respective AP. In some other examples, the sharing AP may directly measure potential interference of a service supported (such as UL transmission) at one or more APs, and select the shared APs based on the measured potential interference. The sharing AP generally selects the APs to participate in coordinated spatial reuse such that it still protects its own transmissions (which may be referred to as primary transmissions) to and from the STAs in its BSS. The selected APs may then be allocated resources during the TXOP as described above.

In some implementations, the AP 102 and STAs 104 can support various multi-user communications; that is, concurrent transmissions from one device to each of multiple devices (for example, multiple simultaneous downlink communications from an AP 102 to corresponding STAs 104), or concurrent transmissions from multiple devices to a single device (for example, multiple simultaneous uplink transmissions from corresponding STAs 104 to an AP 102). As an example, in addition to MU-MIMO, the AP 102 and STAs 104 may support OFDMA. OFDMA is in some aspects a multi-user version of OFDM.

In OFDMA schemes, the available frequency spectrum of the wireless channel may be divided into multiple resource units (RUs) each including multiple frequency subcarriers (also referred to as "tones"). Different RUs may be allocated or assigned by an AP 102 to different STAs 104 at particular times. The sizes and distributions of the RUs may be referred to as an RU allocation. In some examples, RUs may be allocated in 2 MHz intervals, and as such, the smallest RU may include 26 tones consisting of 24 data tones and 2 pilot tones. Consequently, in a 20 MHz channel, up to 9 RUs (such as 2 MHz, 26-tone RUs) may be allocated (because some tones are reserved for other purposes). Similarly, in a 160 MHz channel, up to 74 RUs may be allocated. Other tone RUs also may be allocated, such as 52 tone, 106 tone, 242 tone, 484 tone and 996 tone RUs. Adjacent RUs may be separated by a null subcarrier (such as a DC subcarrier), for example, to reduce interference between adjacent RUs, to reduce receiver DC offset, and to avoid transmit center frequency leakage.

For UL MU transmissions, an AP 102 can transmit a trigger frame to initiate and synchronize an UL OFDMA or UL MU-MIMO transmission from multiple STAs 104 to the AP 102. Such trigger frames may thus enable multiple STAs 104 to send UL traffic to the AP 102 concurrently in time. A trigger frame may address one or more STAs 104 through respective association identifiers (AIDs), and may assign each AID (and thus each STA 104) one or more RUs that can be used to send UL traffic to the AP 102. The AP also may designate one or more random access (RA) RUs that unscheduled STAs 104 may contend for.

In some wireless communications systems, an AP 102 may allocate or assign multiple RUs to a single STA 104 in an OFDMA transmission (hereinafter also referred to as "multi-RU aggregation"). Multi-RU aggregation, which facilitates puncturing and scheduling flexibility, may ultimately reduce latency. As increasing bandwidth is supported by emerging standards (such as the IEEE 802.11be standard amendment supporting 320 MHz and the IEEE 802.11bn standard amendment supporting 480 MHz and 640 MHz), various multiple RU (multi-RU) combinations may exist. Values indicating the various multi-RU combinations may be provided by a suitable standard specification (such as one or more of the IEEE 802.11 family of wireless communication protocol standards including the 802.11be standard amendment).

As Wi-Fi is not the only technology operating in the 6 GHz band, the use of multiple RUs in conjunction with channel puncturing may enable the use of large bandwidths such that high throughput is possible while avoiding transmitting on frequencies that are locally unauthorized due to incumbent operation. Puncturing may be used in conjunction with multi-RU transmissions to enable wide channels to be established using non-contiguous spectrum blocks. In such examples, the portion of the bandwidth between two RUs allocated to a particular STA 104 may be punctured. Accordingly, spectrum efficiency and flexibility may be increased.

As described previously, STA-specific RU allocation information may be included in a signaling field (such as the EHT-SIG field for an EHT PPDU) of the PPDU's preamble. Preamble puncturing may enable wider bandwidth transmissions for increased throughput and spectral efficiency in the presence of interference from incumbent technologies and other wireless communication devices. Because RUs may be individually allocated in a MU PPDU, use of the MU PPDU format may indicate preamble puncturing for SU transmissions. While puncturing in the IEEE 802.11ax standard amendment was limited to OFDMA transmissions, the IEEE 802.11be standard amendment extended puncturing to SU transmissions. In some examples, the RU allocation information in the common field of EHT-SIG can be used to individually allocate RUs to the single user, thereby avoiding the punctured channels. In some other examples, U-SIG may be used to indicate SU preamble puncturing. For example, the SU preamble puncturing may be indicated by a value of the EHT-SIG compression field in U-SIG.

In some environments, locations, or conditions, a regulatory body may impose a power spectral density (PSD) limit for one or more communication channels or for an entire band (for example, the 6 GHz band). A PSD is a measure of transmit power as a function of a unit bandwidth (such as per 1 MHz). The total transmit power of a transmission is consequently the product of the PSD and the total bandwidth by which the transmission is sent. Unlike the 2.4 GHz and 5 GHz bands, the United States Federal Communications Commission (FCC) has established PSD limits for low power devices when operating in the 6 GHz band. The FCC has defined three power classes for operation in the 6 GHz band: standard power, low power indoor, and very low power. Some APs 102 and STAs 104 that operate in the 6 GHz band may conform to the low power indoor (LPI) power class, which limits the transmit power of APs 102 and STAs 104 to 5 decibel-milliwatts per megahertz (dBm/MHz) and −1 dBm/MHz, respectively. In other words, transmit power in the 6 GHz band is PSD-limited on a per-MHz basis.

Such PSD limits can undesirably reduce transmission ranges, reduce packet detection capabilities, and reduce channel estimation capabilities of APs 102 and STAs 104. In some examples in which transmissions are subject to a PSD limit, the AP 102 or the STAs 104 of the wireless communication network 100 may transmit over a greater transmission bandwidth to allow for an increase in the total transmit power, which may increase an SNR and extend coverage of the wireless communication devices. For example, to overcome or extend the PSD limit and improve SNR for low power devices operating in PSD-limited bands, 802.11be introduced a duplicate (DUP) mode for a transmission, by which data in a payload portion of a PPDU is modulated for transmission over a “base” frequency sub-band, such as a first RU of an OFDMA transmission, and copied over (for example, duplicated) to another frequency sub-band, such as a second RU of the OFDMA transmission. In DUP mode, two copies of the data are to be transmitted, and, for each of the duplicate RUs, using dual carrier modulation (DCM), which also has the effect of copying the data such that two copies of the data are carried by each of the duplicate RUs, so that, for example, four copies of the data are transmitted. While the data rate for transmission of each copy of the user data using the DUP mode may be the same as a data rate for a transmission using a “normal” mode, the transmit power for the transmission using the DUP mode may be essentially multiplied by the number of copies of the data being transmitted, at the expense of requiring an increased bandwidth. As such, using the DUP mode may extend range but reduce spectrum efficiency.

In some other examples in which transmissions are subject to a PSD limit, a distributed tone mapping operation may be used to increase the bandwidth via which a STA 104 transmits an uplink communication to the AP 102. As used herein, the term “distributed transmission” refers to a PPDU transmission on noncontiguous tones (or subcarriers) of a wireless channel. In contrast, the term “contiguous transmission” refers to a PPDU transmission on contiguous tones. As used herein, a logical RU represents a number of tones or subcarriers that are allocated to a given STA 104 for transmission of a PPDU. As used herein, the term “regular RU” (or rRU) refers to any RU or MRU tone plan that is not distributed, such as a configuration supported by 802.11be or earlier versions of the IEEE 802.11 family of wireless communication protocol standards. As used herein, the term “distributed RU” (or dRU) refers to the tones distributed across a set of noncontiguous subcarrier indices to which a logical RU is mapped. The term “distributed tone plan” refers to the set of noncontiguous subcarrier indices associated with a dRU. The channel or portion of a channel within which the distributed tones are interspersed is referred to as a spreading bandwidth, which may be, for example, 40 MHz, 80 MHz or more. The use of dRUs may be limited to uplink communications because benefits to addressing PSD limits may only be present for uplink communications.

In some examples, neighboring BSSs may support coordinated spatial reuse. For example, a first wireless device, such as an AP 102 or a STA 104 (including a STA operating as a softAP) associated with a first BSS, may advertise a set of one or more service periods designated for spatial reuse and an interference threshold associated with the set of one or more service periods designated for spatial reuse. For example, the first wireless device may advertise the set of one or more service periods designated for spatial reuse and the interference threshold associated via a beacon frame or via a management frame. A second wireless device (such as an AP 102 or a STA 104) associated with a second BSS may receive the advertisement and communicate with one or more other wireless devices (such as one or more STAs 104 associated with the second BSS) associated with the second BSS during the indicated set of service periods in accordance with the indicated interference threshold. The wireless devices associated with the second BSS may limit their transmit power to levels that produce acceptable amounts of interference to the wireless devices associated with the first BSS.

In some examples, the first wireless device associated with the first BSS may communicate with multiple client wireless devices associated with the first BSS. The first wireless device may group the client wireless devices into a first group of client devices associated with a relatively higher signal strength and a second group of client wireless devices associated with a relatively lower signal strength. The first wireless device may communicate with the first group of client devices associated with the relatively higher signal strength during the service periods designated for spatial reuse as communications involving the first group are less likely to be susceptible to interference from another BSS, and with the second group of client devices during one or more other service periods that are orthogonal to the service periods designated for spatial reuse.

In some examples, the wireless devices associated with the second BSS may calculate, determine, ascertain or select, in each service period designated for spatial reuse, allowable transmission powers that will keep interference at wireless devices associated with the first BSS within an acceptable level. The wireless devices associated with the second BSS may calculate, determine, ascertain or select the allowable transmission powers in accordance with the indicated interference threshold and measurements of signals transmitted by wireless devices associated with the first BSS. For example, the wireless devices associated with the second BSS may calculate, determine or ascertain pathlosses between the wireless devices in the first BSS and the wireless devices in accordance with the measurements of signals transmitted by wireless devices associated with the first BSS, and the pathlosses may be used in association with the indicated interference threshold to calculate, determine, ascertain or select allowable transmission powers.

Figure 5:
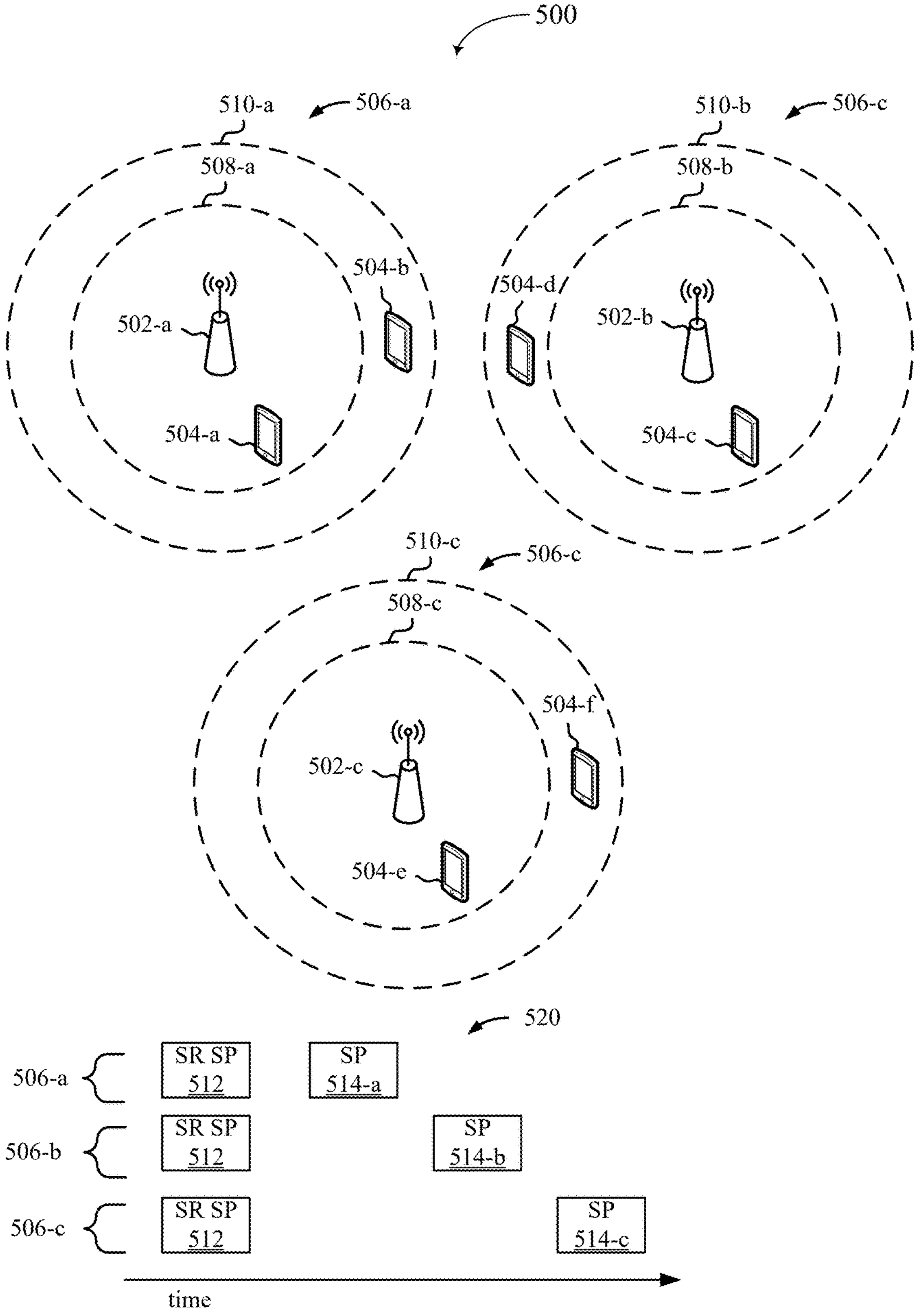
FIG. 5 shows an example of a signaling diagram that supports service period based coordinated spatial reuse.

FIG. 5 shows an example of a signaling diagram 500 that supports service period based coordinated spatial reuse. The signaling diagram 500 may implement or may be implemented by aspects of the wireless communication network 100. For example, the signaling diagram 500 may illustrate communication between wireless devices within the wireless communication network, including a wireless device 502-*a*, a wireless device 502-*b*, and a wireless device 502-*c*. In some aspects, each of the wireless device 502-*a*, the wireless device 502-*b*, and the wireless device 502-*c* may be an example of an AP 102 or STA 104 (such as a STA operating as a soft AP) as illustrated by and described with reference to FIG. 1. The signaling diagram 500 further illustrates client wireless devices, including a client wireless device 504-*a*, a client wireless device 504-*b*, a client wireless device 504-*c*, a client wireless device 504-*d*, a client wireless device 504-*e*, and a client wireless device 504-*f*, which may be examples of STAs 104 as illustrated by and described with reference to FIG. 1.

The wireless device 502-*a*, the client wireless device 504-*a*, and the client wireless device 504-*b* may be associated with a first BSS 506-*a*. The wireless device 502-*b*, the client wireless device 504-*c*, and the client wireless device 504-*d* may be associated with a second BSS 506-*b*. The wireless device 502-*c*, the client wireless device 504-*e*, and the client wireless device 504-*f* may be associated with a third BSS 506-*c*.

Some WLANs, such as the wireless communication system implemented by the signaling diagram 500 may implement spatial reuse. In distributed or ad-hoc spatial reuse schemes, a wireless device (such as the wireless device 502-*b*, the client wireless device 504-*c*, or the client wireless device 504-*d*) associated with the second BSS 506-*b* may identify that a TXOP is being used by a different BSS (such as one of the first BSS 506-*a*) and may back off transmission power for a transmission in the TXOP in the second BSS 506-*b*. Depending on the relative positions of the client wireless devices 504 within their respective BSSs 506 interference and gain in distributed or ad-hoc spatial reuse schemes may vary. For example, because a proximity between the client wireless device 504-*d* and the first BSS 506-*a* is less than a proximity between the client wireless device 504-*c* and the first BSS 506-*a*, a transmission by the client wireless device 504-*d* may be more likely to cause interference at the wireless devices in the first BSS 506-*a* than a transmission by the client wireless device 504-*c*.

In some coordinated spatial reuse schemes, the wireless devices 502 may communicate transmission power parameters at every TXOP to reduce interference. For example, a wireless device 502 associated with a first BSS may transmit control signaling in each TXOP, such as in a management frame, to indicate the transmission power that other wireless devices in other BSSs may use during that TXOP. The time for the other wireless devices in the other BSSs to process the control signaling before transmitting in accordance with the indicated allowed transmission power may correspond to a SIFS. These coordinated spatial reuse schemes may have improved throughput in comparison to distributed or ad-hoc spatial reuse schemes, but also may carry a prohibitively high cost of signaling overhead to coordinate transmission power parameters between BSSs at each TXOP.

Accordingly, described techniques may balance between the complexity and gains associated with coordinated spatial reuse. For example, coordinated spatial reuse may be implemented using relatively longer-term signaling (such as via beacons or through management frame signaling) and service periods designated for spatial reuse (such as target wake times (TWTs) or restricted TWTs (rTWTs), which are TWTs for which transmissions are limited to certain wireless devices). As such, coordinated spatial reuse may be implemented at the service period level as compared to the TXOP level.

A sharing wireless device (such as the wireless device 502-*a*) may announce spatial reuse criteria in a beacon or other management frame for one or more shared wireless devices (such as the wireless device 502-*b* and the wireless device 502-*c*). The one or more shared wireless devices may include or forward the sharing wireless device's coordinated spatial reuse criteria in the OBSS service period information sent in the beacons of the one or more shared wireless devices to inform the associated client wireless devices (such as the client wireless device 504-*c* and the client wireless device 504-*d* for the wireless device 502-*b* and the client wireless device 504-*e* and the client wireless device 504-*f* for the wireless device 502-*c*). The shared wireless devices (such as the wireless device 502-*b* and the wireless device 502-*c*) and the associated client wireless devices may derive local decisions for reusing over the sharing wireless device during a spatial reuse service period. A spatial reuse service period refers to a service period, such as a TWT, rTWT, or other service period that is specifically designated for spatial reuse. For example, there may be no explicit signaling back and forth between the wireless devices 502 in the different BSSs 506 during the spatial reuse service period. The local decisions may include a decision on whether to participate in spatial reuse over the sharing wireless device associated with the criteria advertised by the sharing AP. The local decisions also may include a decision on the maximum power the shared wireless devices and the associated client wireless devices may use during the spatial reuse service period, depending on an interference threshold indicated by the sharing wireless device in the announced spatial reuse criteria.

In some examples, the wireless devices 502 may classify client wireless devices as "inner" or "outer" clients. For example, the client wireless device 504-*a* may be an inner client of the wireless device 502-*a* (such as in an inner zone 508-*a*) and the client wireless device 504-*b* may be an outer client of the wireless device 502-*a* (such as in an outer zone 510-*a*). As another example, the client wireless device 504-*c* may be an inner client of the wireless device 502-*b* (such as in an inner zone 508-*b*) and the client wireless device 504-*d* may be an outer client of the wireless device 502-*b* (such as in an outer zone 510-*b*). As another example, the client wireless device 504-*e* may be an inner client of the wireless device 502-*c* (such as in an inner zone 508-*c*) and the client wireless device 504-*f* may be an outer client of the wireless device 502-*c* (such as in an outer zone 510-*c*). Inner client wireless devices may have a high SINR for communications with the wireless devices 502, for example, associated with the close proximity of the inner client wireless device to the wireless devices 502.

In some examples, the wireless device 502-*a* may tag client wireless devices as inner client wireless devices (such as the client wireless device 504-*a*) or outer client wireless devices (such as the client wireless device 504-*b*) in accordance with respective MCSs or signals strengths for communications with the client wireless devices. In some examples, the wireless device 502-*b* may tag client wireless devices as inner client wireless devices (such as the client wireless device 504-*c*) or outer client wireless devices (such as the client wireless device 504-*d*) in accordance with respective MCSs or signals strengths for communications with the client wireless devices. In some examples, the wireless device 502-*c* may tag client wireless devices as inner client wireless devices (such as the client wireless device 504-*e*) or outer client wireless devices (such as the client wireless device 504-*f*) in accordance with respective MCSs or signals strengths for communications with the client wireless devices. For example, the wireless device 502-*a* may communicate reference signals with the client wireless devices 504 in the first BSS 506-*a* served by the wireless device 502-*a* and may determine the MCSs or signals strengths associated with the client wireless devices 504 in the first BSS 506-*a* using the reference signals. The wireless device 502-*a* may store in memory of the wireless device 502-*a* a list of client wireless devices 504 that have been tagged as inner client wireless devices and outer client wireless devices in accordance with the respective MCSs or signals strengths.

As shown in the timing diagram 520, the wireless devices (such as the wireless device 502-*a*, the wireless device 502-*b*, and the wireless device 502-*c*) may serve inner client wireless devices (such as the client wireless device 504-*a*, the client wireless device 504-*c*, and the client wireless device 504-*e*) during a spatial reuse service period 512 and may serve outer client wireless devices (such as the client wireless device 504-*b*, the client wireless device 504-*d*, and the client wireless device 504-*f*) during regular service periods 514, which are defined as service periods that are not specifically designated for spatial reuse. The regular service periods 514 between the BSSs 506 may be orthogonal to each other, meaning that they do not overlap in time. For example, the wireless device 502-*a* may serve the client wireless device 504-*b* during the regular service period 514-*a*, the wireless device 502-*b* may serve the client wireless device 504-*d* during the regular service period 514-*b*, and the wireless device 502-*c* may serve the client wireless device 504-*f* during the regular service period 514-*c*.

Figure 6:
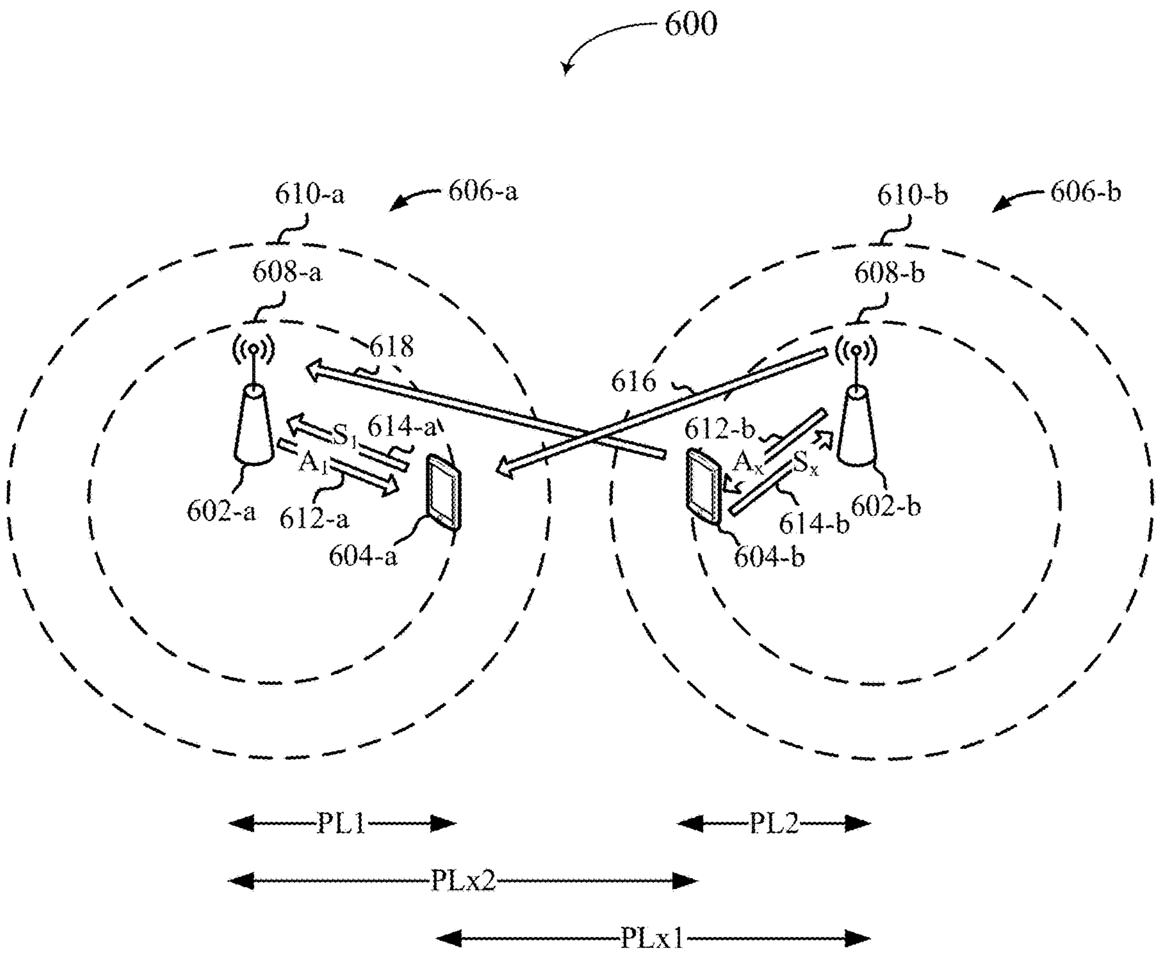
FIG. 6 shows an example of a signaling diagram that supports service period based coordinated spatial reuse.
Figure 6:
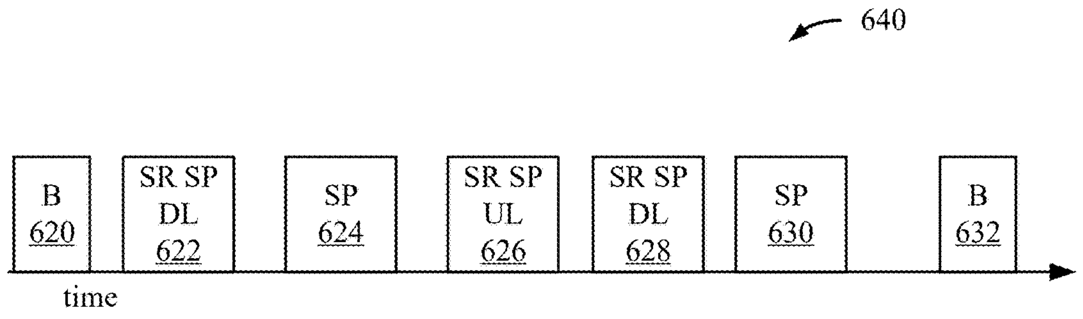

FIG. 6 shows an example of a signaling diagram 600 that supports service period based coordinated spatial reuse. The signaling diagram 600 may implement or may be implemented by aspects of the wireless communication network 100 or the signaling diagram 500. For example, the signaling diagram 600 illustrates communications between a wireless device 602-*a* and a wireless device 602-*b*, which may be examples of wireless devices 502 as illustrated by and described with reference to FIG. 5. The signaling diagram 600 also may include a client wireless device 604-*a* and a client wireless device 604-*b*, which may be examples of client wireless devices 504 as illustrated by and described with reference to FIG. 5. As shown, the wireless device 602-*a* may serve client wireless devices 604 in an inner zone 608-*a* and an outer zone 610-*a*, and the wireless device 602-*b* may serve client wireless devices in an inner zone 608-*b* and an outer zone 610-*b*. The wireless device 602-*a* and the client wireless device 604-*a* may be associated with a BSS 606-*a*. The wireless device 602-*b* and the client wireless device 604-*b* may be associated with a BSS 606-*b*.

The wireless device 602-*a* may transmit a communication 612-*a* to the client wireless device 604-*a*, and the client wireless device 604-*a* may transmit a communication 614-*a* to the wireless device 602-*a*. The wireless device 602-*b* may transmit a communication 612-*b* to the client wireless device 604-*b*, and the client wireless device 604-*b* may transmit a communication 614-*b* to the wireless device 602-*b*.

For the purposes of spatial reuse, the wireless device 602-*a* may be considered a sharing wireless device and the wireless device 602-*b* may be considered a shared wireless device. For example, as shown in the timing diagram 640, the wireless device 602-*a* may announce in a beacon or management frame 620 one or more spatial reuse service periods (such as the downlink spatial reuse service period 622, the uplink spatial reuse service period 626, or the downlink spatial reuse service period 628) and one or more parameters or criteria for the spatial reuse service periods (such as an interference threshold or which BSSs 606 are allowed to transmit within the spatial reuse service periods). The one or more parameters may be expected to last for multiple TBTTs (such as for multiple service periods). Thus, the coordinated spatial reuse scheme may be set on a long-term basis. The spatial reuse service periods may be interspersed with regular service periods (such as the service period 624 and the service period 630). A second beacon or management frame 632 may announce a next set of one or more spatial reuse service periods and one or more parameters for the next set of one or more spatial reuse service periods.

To select the one or more parameters for the spatial reuse service periods, the wireless device 602-*a* may consider the worst-case scenario (such as associated with the worst case SINR) for each spatial reuse service period. For example, the wireless device 602-*a* may calculate, determine, ascertain or select an MCS cutoff for the edge of the inner zone 608-*a*. For example, as shown, the client wireless device 604-*a* is within the inner zone 608-*a*. The wireless device 602-*a* may calculate, determine, obtain, ascertain or select a pathloss (represented as PL1) between the worst case client wireless device in the inner zone 608-*a* (such as the client wireless device 604-*a*). For downlink communications, the interference threshold announced in the beacon or management frame 620 may be associated with the transmission power (represented as A1 in FIG. 6) of the communication 612-*a* and the pathloss PL1, where the transmission power A1 may depend on the MCS for the client wireless device 604-*a*, which may depend on the SINR. For uplink communications, the interference threshold announced in the beacon or management frame 620 may be associated with the transmission power (represented as S1) of the communication 614-*a* and the pathloss PL1, where the transmission power S1 may depend on the MCS for the client wireless device 604-*a*, which may depend on the SINR.

The wireless device 602-*b* may comply with the spatial reuse criteria announced in the beacon or management frame 620 within the spatial reuse service periods (such as the downlink spatial reuse service period 622, the uplink spatial reuse service period 626, or the downlink spatial reuse service period 628). For example, for downlink scenarios, the interference 616 caused by the communication 612-*b* at the client wireless device 604-*a* (such as interference with respect to reception of the communication 612-*a*) may be within an acceptable level associated with the indicated interference threshold. As another example, for uplink scenarios, the interference 618 caused by the communication 614-*b* at the wireless device 602-*a* (such as interference with respect to reception of the communication 614-*a*) may be within an allowable level associated with the indicated interference threshold. For example, the wireless device 602-*b* or the client wireless device 604-*b* may calculate, determine, obtain, ascertain or select in each spatial reuse service period a pathloss PL2 between the wireless device 602-*b* and the client wireless device 604-*b*. For downlink scenarios, the wireless device 602-*b* may calculate, determine, ascertain or select a pathloss PLx1 between the wireless device 602-*b* and the client wireless device 604-*a*. The transmission power Ax the wireless device 602-*b* uses for the communication 612-*b* may be calculated, determined, obtained, ascertained or selected in accordance with the interference threshold, the pathloss PL2, and the pathloss PLx1 to keep the interference 616 caused by the communication 612-*b* within or below an acceptable level. For uplink scenarios, the client wireless device 604-*b* may calculate, determine, obtain, ascertain or select a pathloss PLx2 between the client wireless device 604-*b* and the wireless device 602-*a*. The transmission power (represented as Sx) that the client wireless device 604-*b* uses for the communication 614-*b* may be calculated, determined, obtained, ascertained or selected in accordance with the interference threshold, the pathloss PL2, and the pathloss PLx2 to keep the interference 618 caused by the communication 614-*b* within or below an acceptable level.

Figure 7:
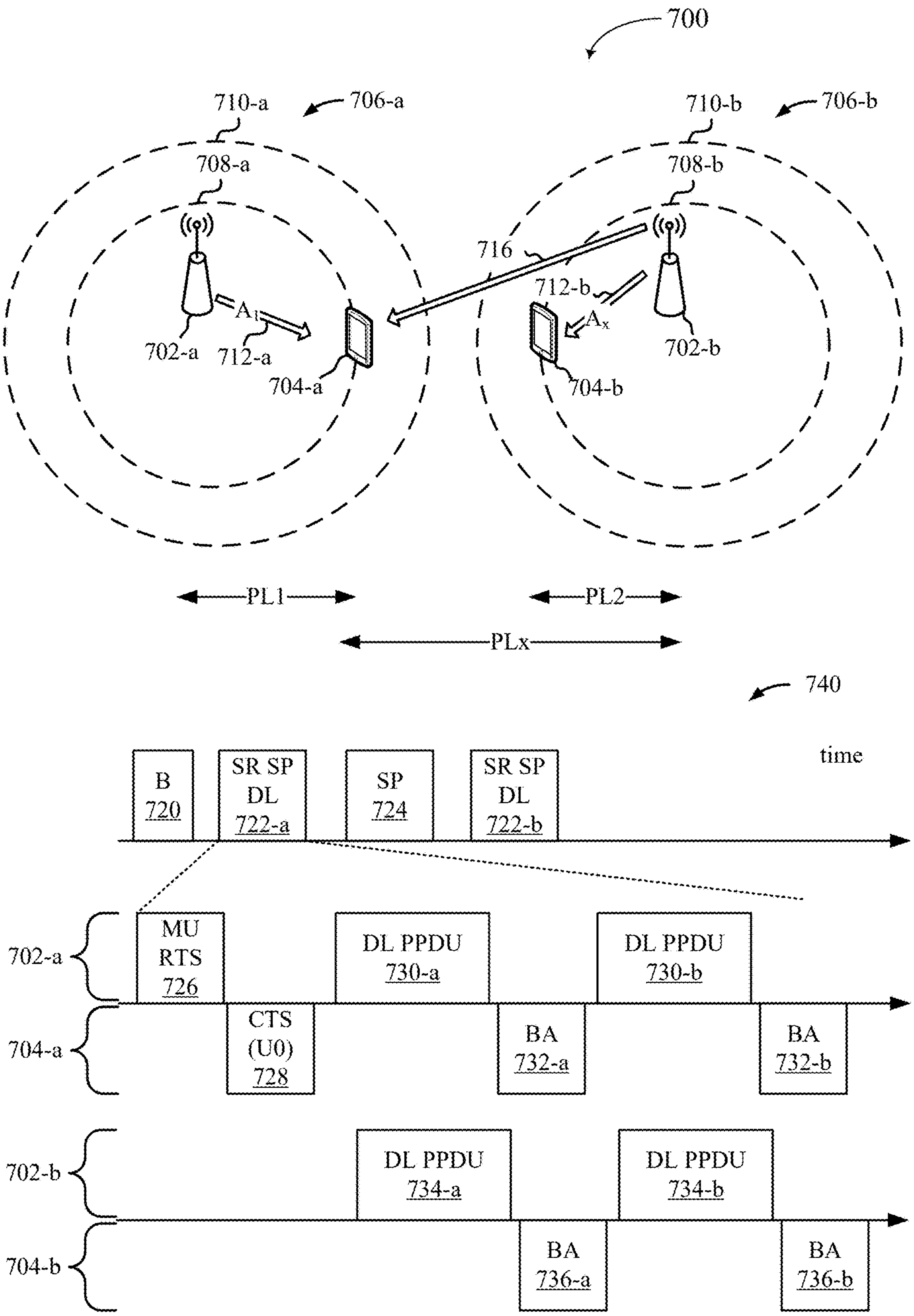
FIG. 7 shows an example of a signaling diagram that supports service period based coordinated spatial reuse for downlink/downlink scenarios.

FIG. 7 shows an example of a signaling diagram 700 that supports service period based coordinated spatial reuse for downlink/downlink scenarios. The signaling diagram 700 may implement or may be implemented by aspects of the wireless communication network 100, the signaling diagram 500, or the signaling diagram 600. For example, the signaling diagram 700 illustrates communications between a wireless device 702-*a* and a wireless device 702-*b*, which may be examples of wireless devices 502 or wireless devices 602 as illustrated by and described with reference to FIGS. 5 and 6, respectively. The signaling diagram 700 also illustrates a client wireless device 704-*a* and a client wireless device 704-*b*, which may be examples of client wireless devices 504 or client wireless devices 604 as illustrated by and described with reference to FIGS. 5 and 6, respectively. As shown, the wireless device 702-*a* may serve client wireless devices in an inner zone 708-*a* and an outer zone 710-*a*, and the wireless device 702-*b* may serve client wireless devices in an inner zone 708-*b* and an outer zone 710-*b*. The wireless device 702-*a* may transmit a communication 712-*a* to the client wireless device 704-*a* and the wireless device 702-*b* may transmit a communication 712-*b* to the client wireless device 704-*b*. The wireless device 702-*a* and the client wireless device 704-*a* may be associated with a BSS 706-*a*. The wireless device 702-*b* and the client wireless device 704-*b* may be associated with a BSS 706-*b*. In some examples, the wireless device 702-*a* may tag client wireless devices 704 associated with the BSS 706-*a* as inner or outer client wireless devices in accordance with respective MCSs or signals strengths for communications with the client wireless devices as described with reference to FIG. 5. Similarly, the wireless device 702-*b* may tag client wireless devices 704 associated with the BSS 706-*b* as inner or outer client wireless devices in accordance with respective MCSs or signals strengths for communications with the client wireless devices 704 as described with reference to FIG. 5.

The wireless device 702-*a* (which may be the sharing wireless device) may transmit a beacon 720 which announces a set of one or more spatial reuse service periods. The wireless device 702-*a* may communicate with one or more client wireless devices 704 (such as the client wireless device 704-*a*) in the BSS 706-*a* tagged as inner client wireless devices during the spatial reuse service periods. For example, the set of spatial reuse service periods may include a downlink spatial reuse service period 722-*a* and a downlink spatial reuse service period 722-*b*. A regular service period 724 may be interspersed with the downlink spatial reuse service period 722-*a* and the downlink spatial reuse service period 722-*b*. The wireless device 702-*a* may communicate with client wireless devices in the outer zone 710-*a* (such as client wireless devices associated with the BSS 706-*a* tagged as outer client wireless devices) during the regular service period 724, or the wireless device 702-*b* may communicate with client wireless devices in the outer zone 710-*b* (such as client wireless devices associated with the BSS 706-*b* tagged as outer client wireless devices) during the regular service period 724. For example, the beacon 720 may advertise that the wireless device 702-*b* may communicate with client wireless devices in the BSS 706-*b* during the downlink spatial reuse service periods 722 in accordance with spatial reuse criteria indicated in the beacon 720. The wireless device 702-*a* may calculate, determine, obtain, ascertain or select the parameters of the inner zone 708-*a* on a long-term basis (such as where applicable to multiple spatial reuse service periods). For example, the wireless device 702-*a* may calculate, determine, obtain, ascertain or select a worst pathloss PL1 between the wireless device 702-*a* and any point in the inner zone 708-*a*. The wireless device 702-*a* may calculate, determine, obtain, ascertain or select an MCS cutoff for the client wireless devices in the inner zone 708-*a* (and thus an SINR). For example, the wireless device 702-*a* may communicate reference signals with client wireless devices served by the wireless device 702-*a* to calculate, determine, obtain, ascertain or select the SINR (and thus MCS) or pathloss for each client wireless device served by the wireless device 702-*a*. The wireless device 702-*a* may calculate, determine, obtain, ascertain or select the downlink transmission power A1 for the communication 712-*a*, where the communication 712-*a* is the communication to the highest MCS client within the BSS 706-*a*. The wireless device 702-*b* (which may be the shared wireless device) may calculate, determine, obtain, ascertain or select downlink power Ax for downlink communications in the spatial reuse service periods (such as for the communication 712-*b*) on a per service period basis. In some examples, for simplicity, the wireless device 702-*b* may calculate, determine, obtain, ascertain or select the downlink transmission power on a long term basis, but in such scenarios the wireless device 702-*b* may lose some transmission opportunities while learning the long term downlink transmission power.

A1 may refer to the downlink transmission power that the wireless device 702-*a* uses for communication in the inner zone 708-*a* for the highest MCS within the BSS 706-*a* during spatial reuse service periods. Ax may refer to the downlink transmission power the wireless device 702-*b* may use for during spatial reuse service periods. PL1 may refer to the worst path loss at any point in the inner zone 708-*a* of the wireless device 702-*a*. PLx may refer to the pathloss from the wireless device 702-*b* to the worst case client wireless device (such as the client wireless device 704-*a*) of the BSS 706-*a* supported by the wireless device 702-*a*. The wireless device 702-*b* may measure PLx at the beginning of each spatial reuse service period (such as associated with the RSSI of clear to send (CTS) messages transmitted by client wireless devices in response to a multi-user request to send (MU-RTS) message transmitted by the wireless device 702-*a*) to calculate, determine, obtain, ascertain or select the downlink transmission power Ax. The acceptable signal to interference ratio (SIR), which corresponds to the lowest SIR at which the client wireless device 704-*a* can receive and decode a downlink communication transmitted with a power A1 may be given by $SIR=(A1-PL1)-(Ax-PLx)$, ignoring thermal noise for simplicity of calculations. Accordingly $Ax-PLx$ may be the maximum acceptable interference. The equation $SIR=(A1-PL1)-(Ax-PLx)$ may be rearranged, solving for Ax, as $Ax=(A1-PL1-SIR)+PLx$. $(A1-PL1-SIR)$ may be referred to as coordinated spatial reuse downlink parameter (CSR-DL_P) or as the interference threshold, and may be the maximum interference from the wireless device 702-*b* (the shared wireless device) allowed by the wireless device 702-*a* (the sharing wireless device) in a spatial reuse service period. The wireless device 702-*a* may announce $(A1-PL1-SIR)$ in the beacon 720.

As shown in the timing diagram 740, the wireless device 702-*a* may transmit a beacon 720 indicating the interference threshold (CSR-DL_P) for a set of spatial reuse service periods 722. In some examples, the wireless device 702-*a* also may indicate additional budgets for multiple shared BSSs 706 (such as if there is more than one shared BSS). In some examples, the wireless device 702-*a* also may indicate in the beacon 720 an uplink reference power (represented as U0) or a maximum uplink transmission power. The uplink reference power U0 or the maximum uplink transmission power may be the maximum transmission power for all uplink transmissions within the set of spatial reuse service periods 722 for the client wireless devices associated with the wireless device 702-*a* (such as in the BSS 706-*a*). In some examples, the wireless device 702-*a* also may indicate in the beacon 720 an MCS0 transmission power for all uplink transmissions within the set of spatial reuse service periods 722 for the client wireless devices associated with the wireless device 702-*a*, which may include a CTSframe set at MCS0. Different downlink service periods may have a different U0 value depending on the transmission power capabilities of the client wireless devices, and accordingly in some examples, the wireless device 702-*a* may group different sets of downlink spatial reuse service periods according to U0 values.

In a downlink spatial reuse service period 722-*a* of the set of spatial reuse service periods 722, the wireless device 702-*a* may transmit a MU-RTS message 726 at the beginning of the downlink spatial reuse service period 722-*a*. For example, the MU-RTS message 726 may be transmitted to all client wireless devices that the wireless device 702-*a* intends to serve in the BSS 706-*a* in a round robin manner. In some examples, the wireless device 702-*a* may transmit one or more requests to send (RTS) messages instead of an MU-RTS message 726. The client wireless devices (such as the client wireless device 704-*a*) that receive the MU-RTS message 726 (or the one or more RTS messages) may transmit CTS messages 728 to the wireless device 702-*a* in response to the MU-RTS message 726 (or the one or more RTS messages). The CTS messages may be transmitted with the uplink reference power U0 indicated in the beacon 720. The wireless device 702-*b* (such as any shared wireless devices) may measure the CTS messages 728. For example, the wireless device 702-*b* may measure the maximum RSSI among the CTS messages 728 and may calculate, determine, obtain, ascertain or select PLx as follows: PLx=U0−Cxmax, where Cxmax may refer to the maximum RSSI among the CTS messages 728. As another example, the wireless device may calculate the PLx using a single MU-RTS message and CTS to get a combined CTS power. In accordance with the PLx, the wireless device 702-*b* may calculate, determine, obtain, ascertain or select the downlink transmission power for the downlink spatial reuse service period 722-*a*, Ax, as Ax=CSR_DL_P+PLx.

In some examples, the wireless device 702-*b* may calculate a pathloss PLy between the wireless device 702-*b* and the wireless device 702-*a*, for example, using a signal strength measurement of the beacon 720. An offset may then be applied to PLy (such as in accordance with an estimated distance between the worst case client wireless device 704-*a* in the inner zone 708-*a* and the wireless device 702-*a*) in order to estimate PLx, the pathloss from the worst case client wireless device 704-*a* and the wireless device 702-*a*.

For example, the wireless device 702-*b* may transmit a downlink PPDU 734-*a* and a downlink PPDU 734-*b* that overlap with a downlink PPDU 730-*a* and a downlink PPDU 730-*b* transmitted by the wireless device 702-*a* during the downlink spatial reuse service period 722-*a*. The interference 716 at the client wireless device 704-*a* (such as the worst case client wireless device in the inner zone 708-*a*) caused by the overlapping transmissions may thus be below the acceptable interference level, such as the A1−PL1−SIR value indicated in the beacon 720. For example, when the transmission power of the downlink PPDU 734-*a* or the downlink PPDU 734-*b* results in interference at the client wireless device 704-*a* with respect to reception of the downlink PPDU 730-*a* or the downlink PPDU 730-*b* that is less than or equal to the signaled interference threshold (A1−PL1−SIR), then the interference level is acceptable. When the transmission power of the downlink PPDU 734-*a* or the downlink PPDU 734-*b* results in interference at the client wireless device 704-*a* with respect to reception of the downlink PPDU 730-*a* or the downlink PPDU 730-*b* that is greater than the signaled interference threshold (A1−PL1−SIR), then the interference level is not acceptable. The client wireless devices of the wireless device 702-*a* may transmit BAs 732 to the downlink PPDUs 730 (such as a BA 732-*a* for the downlink PPDU 730-*a* and a BA 732-*b* for the downlink PPDU 730-*b*) and the client wireless devices of the wireless device 702-*b* may transmit BAs 736 to the downlink PPDUs 730 (such as a BA 736-*a* for the downlink PPDU 734-*a* and a BA 736-*b* for the downlink PPDU 734-*b*). While the BAs 736 may collide with the BAs 732, as downlink transmission power is limited, the impact may be minimal, and thus such collisions may be ignored.

The wireless device 702-*b* may ignore a NAV set by the wireless device 702-*a* for the downlink spatial reuse service period 722-*a*, for example, in the MU-RTS message 726.

In some examples, the wireless device 702-*b* may calculate, determine, obtain, ascertain or select a long-term calculation of PLx (such as for multiple spatial reuse service periods 722). For example, over a period of time, the wireless device 702-*b* may calculate, determine, obtain, ascertain or select the worst case measurement of PLx and may use the worst case measurement of PLx to calculate, determine, obtain, ascertain or select Ax instead of measuring the CTS RSSI in each spatial reuse service period 722 to calculate, determine, obtain, ascertain or select PLx. In such cases, the wireless device 702-*b* may forgo some transmission opportunities (TxOPs) in the beginning of the set of spatial reuse service periods until the wireless device 702-*b* converges on a particular PLx value.

In some examples, the wireless device 702-*b* may calculate, determine, obtain, ascertain or select a long-term calculation of interference from the wireless device 702-*a*. For example, the wireless device 702-*b* may calculate, determine, obtain, ascertain or select interference statistics over a period that the wireless device 702-*b* experiences and may adjust scheduling or rate adaptation applied in spatial reuse service periods 722 in accordance with the interference statistics.

In some examples, the wireless device 702-*a* may calculate, determine, obtain, ascertain or select the inner zone client wireless devices to be the client wireless devices that have an MCS at or above a threshold (such as MCS5 or above). In some examples, a sharing wireless device (such as the wireless device 702-*a*) may calculate, determine, or ascertain that while sharing a service period with another BSS, the sharing wireless device may afford to reduce the MCS (such as by 1, so that the worst case MCS within the inner zone becomes MCS4).

In some examples, the wireless device 702-*a* may consider the value for all expected client wireless devices within a TBTT and take the minimum value of (A1−PL1−SIR) to calculate, determine, obtain, ascertain or select the CSR-DL_P announced in the beacon 720. In some examples, the wireless device 702-*a* may learn multiple (A1−PL1−SIR) values over a period of time, and may pick the minimum (A1−PL1−SIR) value to announce as the CSR-DL_P in the beacon 720.

Figure 8:
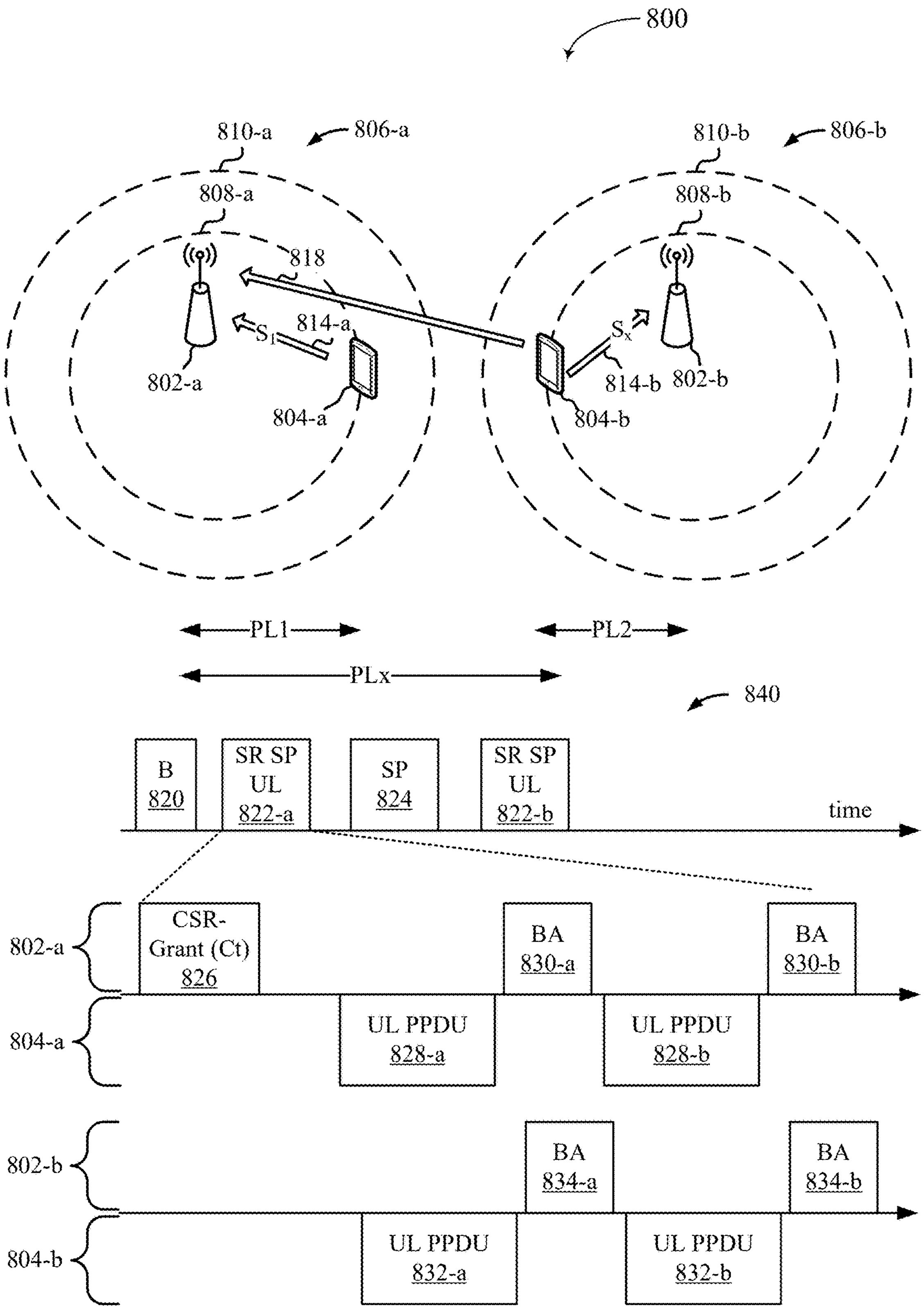
FIG. 8 shows an example of a signaling diagram that supports service period based coordinated spatial reuse for uplink/uplink scenarios.

FIG. 8 shows an example of a signaling diagram 800 that supports service period based coordinated spatial reuse for uplink/uplink scenarios. The signaling diagram 800 may implement or may be implemented by aspects of the wireless communication network 100, the signaling diagram 500, or the signaling diagram 600. For example, the signaling diagram 800 includes a wireless device 802-*a* and a wireless device 802-*b*, which may be examples of wireless devices 502 or wireless devices 602 as illustrated by and described with reference to FIGS. 5 and 6, respectively. The signaling diagram 800 also may include a client wireless device 804-*a* and a client wireless device 804-*b*, which may be examples of client wireless devices 504 or client wireless devices 604 as illustrated by and described with reference to FIGS. 5 and 6, respectively. As shown, the wireless device 802-*a* may serve client wireless devices in an inner zone 808-*a* and an outer zone 810-*a*, and the wireless device 802-*b* may serve client wireless devices in an inner zone 808-*b* and an outer zone 810-*b*. The client wireless device 804-*a* may transmit a communication 814-*a* to the wireless device 802-*a* and the client wireless device 804-*b* may transmit a communication 814-*b* to the wireless device 802-*b*. The wireless device 802-*a* and the client wireless device 804-*a* may be associated with a BSS 806-*a*. The wireless device 802-*b* and the client wireless device 804-*b* may be associated with a BSS 806-*b*. In some examples, the wireless device 802-*a* may tag client wireless devices 804 associated with the BSS 806-*a* as inner or outer client wireless devices in accordance with respective MCSs or signals strengths for communications with the client wireless devices as described with reference to FIG. 5. Similarly, the wireless device 802-*b* may tag client wireless devices 804 associated with the BSS 806-*b* as inner or outer client wireless devices in accordance with respective MCSs or signals strengths for communications with the client wireless devices as described with reference to FIG. 5.

The wireless device 802-*a* (which may be the sharing wireless device) may transmit a beacon 820 which announces a set of one or more spatial reuse service periods. The wireless device 802-*a* may communicate with client wireless devices in the BSS 806-*a* tagged as inner client wireless devices during the spatial reuse service periods. For example, the set of spatial reuse service periods may include an uplink spatial reuse service period 822-*a* and an uplink spatial reuse service period 822-*b*. A regular service period 824 may be interspersed with the uplink spatial reuse service period 822-*a* and the uplink spatial reuse service period 822-*b*. The wireless device 802-*a* may communicate with client wireless devices in the outer zone 810-*a* (such as client wireless devices associated with the BSS 806-*a* tagged as outer client wireless devices) during the regular service period 824, or the wireless device 802-*b* may communicate with client wireless devices in the outer zone 810-*b* (such as client wireless devices associated with the BSS 806-*b* tagged as outer client wireless devices) during the regular service period 824. For example, the beacon 820 may advertise that the wireless device 802-*b* may communicate with client wireless devices in the BSS 806-*b* during the uplink spatial reuse service periods 822 in accordance with spatial reuse criteria indicated in the beacon 820. The wireless device 802-*a* may calculate, determine, obtain, ascertain or select the parameters of the inner zone 808-*a* on a long-term basis (for example, as applicable to multiple spatial reuse service periods). For example, the wireless device 802-*a* may calculate, determine, obtain, ascertain or select a worst pathloss PL1 between the wireless device 802-*a* and any point in the inner zone 808-*a*. The wireless device 802-*a* may calculate, determine, obtain, ascertain or select an MCS cutoff for the client wireless devices in the inner zone 808-*a* (and thus an SINR). For example, the wireless device 802-*a* may communicate reference signals with client wireless devices served by the wireless device 802-*a* to calculate, determine, obtain, ascertain or select the SINR (and thus MCS) or pathloss for each client wireless device served by the wireless device 802-*a*. The wireless device 802-*a* may calculate, determine, obtain, ascertain or select the uplink transmission power S1 for the communication 814-*a*, where the communication 812-*a* is the uplink communication from the highest MCS client within the BSS 806-*a*. Client wireless devices (such as the client wireless device 804-*b*) may calculate, determine, obtain, ascertain or select the uplink transmission power Sx on a per-spatial reuse service period basis. EDCA operations may be assumed, and trigger-based operations may be allowed.

S1 may refer to the maximum uplink transmission power that is allowed within the set of uplink spatial reuse service periods 822 within the BSS 806-*a* (such as for the communication 814-*b* during the uplink spatial reuse service period 822-*a* or the uplink spatial reuse service period 822-*b*). Sx may refer to the uplink transmission power from a client wireless device to the wireless device 802-*b* within the set of uplink spatial reuse service periods 822 within the BSS 806-*b* (such as for the communication 814-*b* during the uplink spatial reuse service period 822-*a* or the uplink spatial reuse service period 822-*b*). PL1 may refer to the worst path loss at any point in the inner zone 808-*a* of the wireless device 802-*a*. PLx may refer to the pathloss from the client wireless device 804-*b* to the wireless device 802-*a*. The acceptable SIR, which corresponds to the lowest SIR at which the wireless device 802-*a* can receive an uplink communication from the client wireless device 804-*a* transmitted with a power S1 may be given by SIR=(S1−PL1)−(Sx−PLx), ignoring thermal noise for simplicity of calculations. The equation SIR=(S1−PL1)−(Sx−PLx) may be rearranged for Sx as Sx=(S1−PL1−SIR)+PLx. (S1−PL1−SIR) may be referred to as coordinated spatial reuse uplink parameter (CSR-UL_P) or as the interference threshold, and may be the maximum interference from a client wireless device in the BSS 806-*b* (the shared BSS) to the wireless device 802-*a* (the sharing wireless device 802) in a spatial reuse service period. The wireless device 802-*a* may announce (S1−PL1−SIR) in the beacon 820. Each client wireless device in the BSS 806-*b* may measure PLx at the beginning of each spatial reuse service period (such as associated with the RSSI of an uplink grant transmitted by the wireless device 802-*a*) to calculate, determine, obtain, ascertain or select the uplink transmission power Sx.

As shown in the timing diagram 840, the wireless device 802-*a* may transmit a beacon 820 indicating the interference threshold (CSR-UL_P) for a set of spatial reuse service periods 822. In some examples, the wireless device 802-*a* also may indicate additional budgets for multiple shared BSSs 806 (such as if there is more than one shared BSS). Wireless devices in the shared BSSs (such as the wireless device 802-*b*) may include an indication of the CSR-UL_P in beacons to indicate the CSR-UL_P to client wireless devices in the shared BSSs. In some examples, the wireless device 802-*a* also may indicate in the beacon 820 an uplink reference power (U0) or a maximum uplink transmission power for the client wireless devices in the inner zone 808-*a*. Wireless devices in the shared BSSs (such as the wireless device 802-*b*) may include an indication of the uplink reference power (U0) or a maximum uplink transmission power in beacons to indicate the uplink reference power (U0) or a maximum uplink transmission power to client wireless devices in the shared BSSs.

In an uplink spatial reuse service period 822-*a* of the set of spatial reuse service periods 822, the wireless device

802-*a* may transmit an uplink grant 826 (such as a coordinated spatial reuse grant) to one or more client wireless devices (including the client wireless device 804-*a*) including an indication of use of the uplink spatial reuse service period 822-*a* for the one or more client wireless devices. The uplink grant 826 may indicate the transmission power at which the frame including the uplink grant 826 is sent (Ct). For example, the uplink grant 826 may be a trigger frame sent for client wireless devices within the BSS 806-*a*. As another example, the uplink grant 826 may be a CTS to self with a special MAC address (in which case the transmission power maybe announced in the beacon 820). Client wireless devices in the BSS 806-*b* (including the client wireless device 804-*b*) may measure the RSSI (Cr) of the uplink grant 826. Client wireless devices in the BSS 806-*b* (including the client wireless device 804-*b*) may calculate, determine, obtain, ascertain or select PLx as follows: PLx=Ct−Cr. For example, the wireless device 802-*b* may receive and forward on the uplink grant 826, and the client wireless devices in the BSS 806-*b* may receive the forwarded uplink grant 826 to calculate, determine, obtain, ascertain or select Ct and Cr. Client wireless devices in the BSS 806-*b* (including the client wireless device 804-*b*) may calculate, determine, obtain, ascertain or select the transmission power for uplink communications in the uplink spatial reuse service period 822-*a*, Sx, as Sx=CSR_UL_P+PLx.

In some examples, the wireless device 802-*b* may calculate a pathloss PLy between the wireless device 802-*b* and the wireless device 802-*a*, for example, using a signal strength measurement of the beacon 820. The wireless device 802-*b* may indicate the pathloss PLy to the client wireless device 804-*b*. The client wireless device 804-*b* may apply an offset to PLy (such as in accordance with an estimated distance between the client wireless device 804-*b* and the wireless device 802-*b*) in order to estimate PLx, the pathloss between the client wireless device 804-*b* and the wireless device 802-*a*.

For example, the client wireless device 804-*b* may transmit an uplink PPDU 832-*a* and an uplink PPDU 832-*b* that overlap with an uplink PPDU 828-*a* and an uplink PPDU 828-*b* transmitted by the client wireless device 804-*a* during the uplink spatial reuse service period 822-*a*. The interference 818 at the wireless device 802-*a* may thus be below the acceptable interference level, (S1−PL1−SIR) value indicated in the beacon 820. For example, when the transmission power of the uplink PPDU 832-*a* or the uplink PPDU 832-*b* results in interference at the wireless device 802-*a* with respect to reception of the uplink PPDU 828-*a* or the uplink PPDU 828-*b* that is less than or equal to the signaled interference threshold (S1−PL1−SIR), then the interference level is acceptable. When the transmission power of the uplink PPDU 832-*a* or the uplink PPDU 832-*b* results in interference at the wireless device 802-*a* with respect to reception of the uplink PPDU 828-*a* or the uplink PPDU 828-*b* that is greater that the signaled interference threshold (S1−PL1−SIR), then the interference level is not acceptable. The wireless device 802-*a* may transmit BAs 830 to the uplink PPDUs 828 (such as a BA 830-*a* for the uplink PPDU 828-*a* and a BA 830-*b* for the uplink PPDU 828-*b*) and the wireless device 802-*b* may transmit BAs 834 to the uplink PPDUs 832 (such as a BA 834-*a* for the uplink PPDU 832-*a* and a BA 834-*b* for the uplink PPDU 832-*b*). While the BAs 830 may collide with the BAs 834, as downlink transmission power is limited, the impact may be minimal, and thus such collisions may be ignored. The wireless device 802-*b* may ignore a NAV set by the wireless device 802-*a* for the uplink spatial reuse service period 822-*a*, for example, in the uplink grant 826.

As described with respect to FIGS. 7 and 8, in the beacons (such as the beacon 720 or the beacon 820) or in management frames, the sharing wireless device (such as the wireless device 702-*a* or wireless device 802-*a*) may announce uplink or downlink spatial reuse periods and associated parameters such as an interference threshold (such as (A1−PL1−SIR) for downlink or (S1−PL1−SIR) for uplink) and a reference or maximum uplink transmission power (such as U0). The shared wireless devices (such as the wireless device 702-*b* and the wireless device 802-*b*) may include an indication of the announced uplink or downlink spatial reuse periods or the associated parameters in OBSS service period information in beacons transmitted by the shared wireless devices. At the beginning of each spatial reuse service period, for downlink spatial reuse service periods, the shared wireless devices (such as the wireless device 702-*b*) may measure the CTS responses from the client wireless devices of the sharing wireless device to calculate, determine, obtain, ascertain or select the downlink transmission power for the shared wireless device for that spatial reuse service period. At the beginning of each spatial reuse service period, for uplink spatial reuse service periods, client wireless devices in shared BSSs may measure the uplink grant (such as a coordinated spatial reuse grant or a CTS-to-self) from the sharing wireless device (such as the wireless device 802-*a*) to calculate, determine, obtain, ascertain or select the uplink transmission power. Such long-term coordinated spatial reuse schemes involve less signaling overhead as compared to TXOP based coordinated spatial reuse schemes. Long-term coordinated spatial reuse schemes also may be more compatible for EDCA based uplink operation as compared to TXOP based coordinated spatial reuse schemes as TXOP based coordinated spatial reuse may involve strict control over which client wireless devices may transmit and at what transmission power.

The sharing wireless device (such as the wireless device 702-*a* or wireless device 802-*a*) may organize or tag client wireless devices as being in an inner zone or outer zone in accordance with spatial reuse criteria. In some examples, an allowed SINR may be used to calculate, determine, obtain, ascertain or select the spatial reuse criteria for inner zone client wireless devices. In some examples, service periods may be tagged to indicate whether spatial reuse is allowed. For example, beacons from a sharing wireless device may indicate whether spatial reuse is allowed or whether each spatial reuse service period is classified as downlink or uplink, for example, for QoS PPDUs. Sharing wireless devices may announce which specific OBSS shared wireless devices are allowed to perform reuse on a specific spatial reuse service period (such as the OBSS AP identifier may be associated with the spatial reuse service period in the announcement beacon). OBSS APs (such as the wireless device 702-*b*) may measure the RSSI of multiple CTS messages (or similar frames) from different client wireless devices of the sharing wireless device to calculate, determine, obtain, ascertain or select the reuse transmission power, Ax. For example, the OBSS APs may use the maximum power from different CTSs to calculate, determine, obtain, ascertain or select the reuse transmission power. In some examples, the shared wireless devices may learn the long-term value of inter-BSS pathloss to use as a criteria during spatial reuse service periods instead of performing reuse in accordance with packets from the sharing wireless devices (such as instead of calculating, determining, obtaining, ascertaining or selecting Ax or Sx in each spatial reuse service period). In some examples, the shared wireless devices may learn the long-term value of interference from the sharing wireless device for the shared wireless devices to select client wireless devices to serve and associated parameters (such as MCS, bandwidth, number of spatial streams) during spatial reuse service periods.

Figure 9:
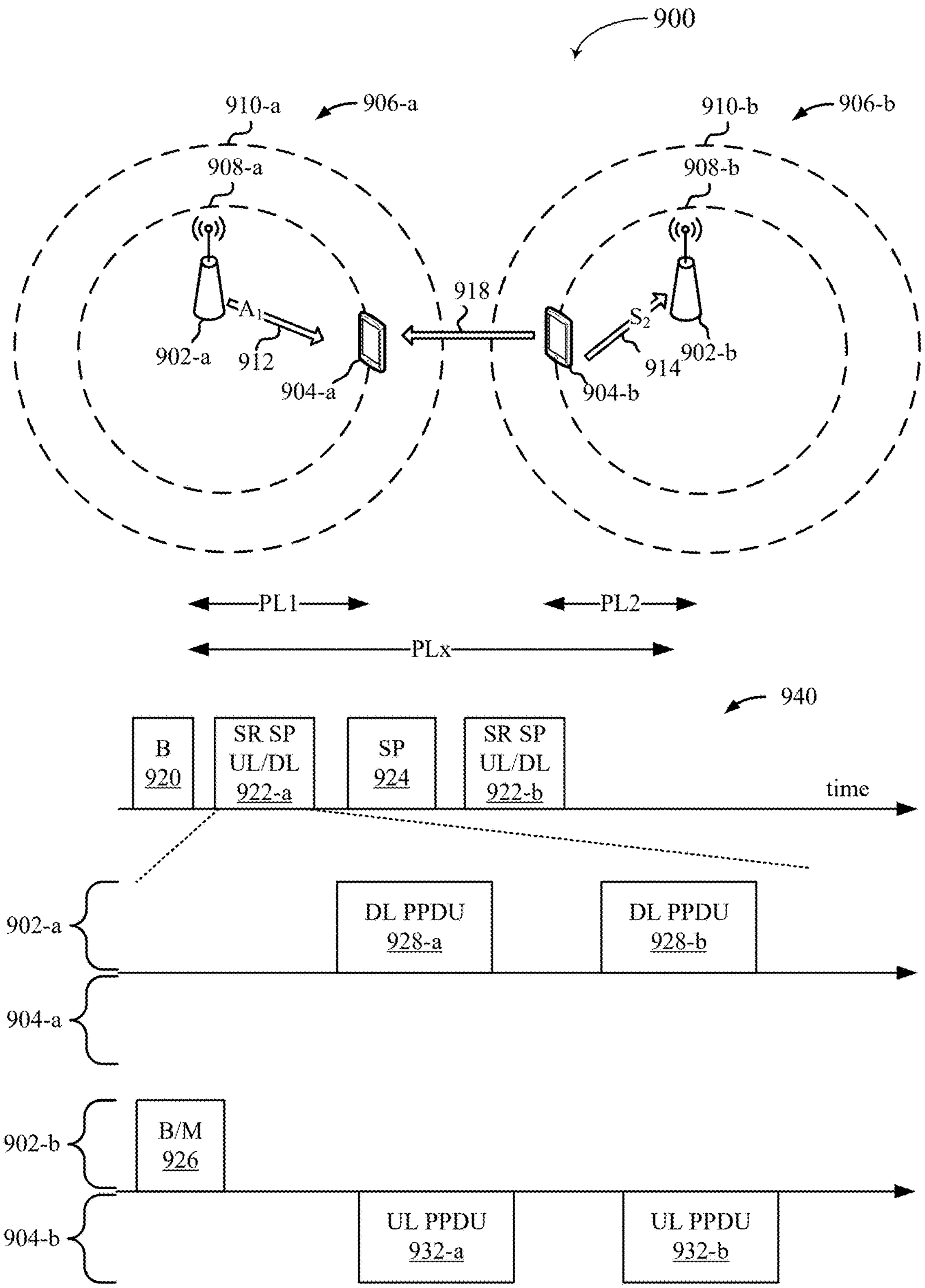
FIG. 9 shows an example of a signaling diagram that supports service period based coordinated spatial reuse for uplink/downlink scenarios.

FIG. 9 shows an example of a signaling diagram 900 that supports service period based coordinated spatial reuse for uplink/downlink scenarios. The signaling diagram 900 may implement or may be implemented by aspects of the wireless communication network 100, the signaling diagram 500, or the signaling diagram 600. For example, the signaling diagram 900 includes a wireless device 902-*a* and a wireless device 902-*b*, which may be examples of wireless devices 502 or wireless devices 602 as illustrated by and described with reference to FIGS. 5 and 6, respectively. The signaling diagram 900 also may include a client wireless device 904-*a* and a client wireless device 904-*b*, which may be examples of client wireless devices 504 or client wireless devices 604 as illustrated by and described with reference to FIGS. 5 and 6, respectively. As shown, the wireless device 902-*a* may serve client wireless devices in an inner zone 908-*a* and an outer zone 910-*a*, and the wireless device 902-*b* may serve client wireless devices in an inner zone 908-*b* and an outer zone 910-*b*. The wireless device 902-*a* may transmit a communication 912 to the client wireless device 904-*a* and the client wireless device 904-*b* may transmit a communication 914 to the wireless device 902-*b*. The wireless device 902-*a* and the client wireless device 904-*a* may be associated with a BSS 906-*a*. The wireless device 902-*b* and the client wireless device 904-*b* may be associated with a BSS 906-*b*. In some examples, the wireless device 902-*a* may tag client wireless devices 904 associated with the BSS 906-*a* as inner or outer client wireless devices in accordance with respective MCSs or signals strengths for communications with the client wireless devices as described with reference to FIG. 5. Similarly, the wireless device 902-*b* may tag client wireless devices 904 associated with the BSS 906-*b* as inner or outer client wireless devices in accordance with respective MCSs or signals strengths for communications with the client wireless devices as described with reference to FIG. 5.

The wireless device 902-*a* (which may be the sharing wireless device) may transmit a beacon 920 which announces a set of one or more spatial reuse service periods 922. The wireless device 902-*a* may communicate with client wireless devices in the BSS 906-*a* tagged as inner client wireless devices during the spatial reuse service periods. For example, the set of spatial reuse service periods may include a spatial reuse service period 922-*a* and a spatial reuse service period 922-*b*. The set of spatial reuse service periods may be used for downlink transmissions in the BSS 906-*a* and for uplink transmissions in the BSS 906-*b*. A regular service period 924 may be interspersed with the spatial reuse service period 922-*a* and the spatial reuse service period 922-*b*. The wireless device 902-*a* may communicate with client wireless devices in the outer zone 910-*a* (such as client wireless devices associated with the BSS 906-*a* tagged as outer client wireless devices) during the regular service period 924, or the wireless device 902-*b* may communicate with client wireless devices in the outer zone 910-*b* (such as client wireless devices associated with the BSS 906-*b* tagged as outer client wireless devices) during the regular service period 924. For example, the beacon 920 may advertise that the wireless device 902-*b* may communicate with client wireless devices in the BSS 906-*b* during the spatial reuse service periods 922 in accordance with spatial reuse criteria indicated in the beacon 920.

The wireless device 902-*a* may calculate, determine, obtain, ascertain or select the parameters of the inner zone 908-*a* on a long-term basis (for example, as applicable to multiple spatial reuse service periods). For example, the wireless device 902-*a* may determine a worst pathloss PL1 between the wireless device 902-*a* and any point in the inner zone 908-*a*. The wireless device 902-*a* may calculate, determine, obtain, ascertain or select an MCS cutoff for the client wireless devices in the inner zone 908-*a* (and thus an SINR). For example, the wireless device 902-*a* may communicate reference signals with client wireless devices served by the wireless device 902-*a* to calculate, determine, obtain, ascertain or select the SINR (and thus MCS) or pathloss for each client wireless device served by the wireless device 902-*a*. The wireless device 902-*a* may calculate, determine, obtain, ascertain or select the downlink transmission power A1 for the communication 912, where the communication 912 is the downlink communication to the highest MCS client within the BSS 906-*a*. Client wireless devices (such as the client wireless device 904-*b*) may calculate, determine, obtain, ascertain or select the uplink transmission power Sx on a per spatial reuse service period basis.

A1 may refer to the downlink transmission power that the wireless device 902-*a* uses for communication in the inner zone 908-*a* for the highest MCS within the BSS 906-*a* during spatial reuse service periods. Sx may refer to the uplink transmission power from a client wireless device to the wireless device 902-*b* within the set of spatial reuse service periods 922 within the BSS 906-*b* (such as for the communication 914 during the spatial reuse service period 922-*a* or the spatial reuse service period 922-*b*). PL1 may refer to the worst path loss at any point in the inner zone 908-*a* of the wireless device 902-*a*. PLx may refer to the pathloss from the wireless device 902-*a* to the wireless device 902-*b*. The wireless device 902-*a* may announce an acceptable interference threshold, which may be referred to as a coordinated spatial reuse parameter (CSR_P), and CSR_P=SIR_s1−A1+2*PL1. As shown, CSR_P may be a function of an expected worst case SIR (SIR_1), the transmission power of the wireless device 902-*a*, and the pathloss to a client wireless device 904 at the edge of the inner zone 908-*a*.

As shown in the timing diagram 940, the wireless device 902-*a* may transmit a beacon 920 indicating the set of multiple spatial reuse service periods 922 and the CSR_P. The beacon 920 also may indicate the beacon or management frame transmission power. In some examples, the beacon 920 also may indicate which BSSs are allowed to transmit during each spatial reuse service period 922. For example, the wireless device 902-*a* may limit use of spatial reuse service periods 922 depending on whether the SIR_s1 has considered the budget from multiple BSSs 906. The wireless device 902-*b* may identify the PLx which may be equal to the announced beacon transmission power minus the measured RSSI of the beacon 920.

In each spatial reuse service period, the wireless device 902-*a* may ensure that the maximum downlink transmission power of downlink transmissions (such as for a downlink PPDU 928-*a* and a downlink PPDU 928-*b*) in the spatial reuse service period 922-*a* is A1. The wireless device 902-*b* may identify for each spatial reuse service period 922, the maximum uplink transmission power S2 as S2=PLx−CSR_P−PL2, where CSR_P=PLx−S2−PL2. PL2 may be calculated, determined, obtained, ascertained or selected in accordance with the size of the inner zone 908-*b*. For example, the wireless device 902-*b* may communicate reference signals with client wireless devices in the BSS 906-*b* to calculate, determine, obtain, ascertain or select PL2. The wireless device 902-*b* may transmit a beacon or management frame 926 that indicates a threshold (such as an MCS threshold) which indicates whether the client wireless devices in the BSS 906-*a* are in the inner zone 908-*a* and the maximum transmission power allowed, S2, during the spatial reuse service period 922-*a*.

Each client wireless device (including the client wireless device 904-*b*) in the BSS 906-*a* may calculate, determine, obtain, ascertain or select whether the respective client wireless device is in the inner zone 908-*b*, and thus is allowed to transmit in the spatial reuse service period 922-*a*. The client wireless devices in the inner zone 908-*b* may obtain the PL2 and the beacon transmission power of the beacon 920 from the beacon or management frame 926 and may be considered in the inner zone 908-*a* if (Tx power−PL2)>threshold, where the threshold may be the threshold indicated in the beacon or management frame 926. Some client wireless devices may be in the inner zones for some spatial reuse periods but not for other spatial reuse service periods, for example, depending on movement or changing channel conditions. For example, the client wireless device 904-*b* may be in the inner zone 908-*a* for the spatial reuse service period 922-*a* but not for the spatial reuse service period 922-*b*.

If a client wireless device calculates, determines, or ascertains that it is in the inner zone 908-*a* for the spatial reuse service period 922-*a*, the client wireless device may transmit a communication 914 during the spatial reuse service period 922-*a*, following the maximum uplink power criteria indicated in the beacon 920. For example, the client wireless device 904-*a* may transmit an uplink PPDU 932-*a* and an uplink PPDU 932-*b* during the spatial reuse service period 922-*a*. The interference 918 at the client wireless device 904-*a* for reception of the downlink PPDUs 928 caused by transmission of the uplink PPDUs 932 may thus be within or below the acceptable level indicated by the interference threshold in the beacon 920. The client wireless device 904-*a* may complete uplink transmissions by the end of the spatial reuse service period 922-*a*.

Figure 10:
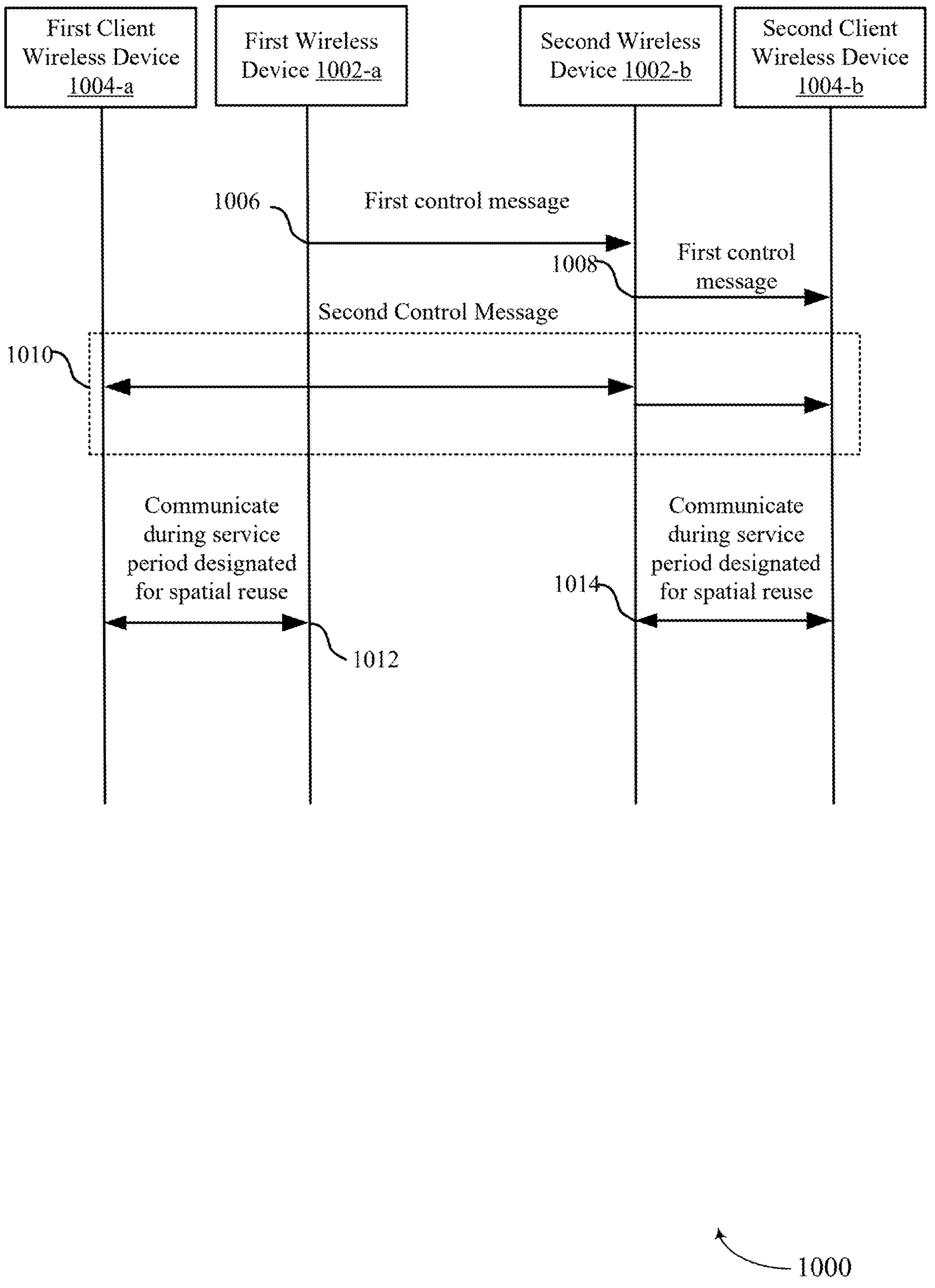
FIG. 10 shows an example of a process flow that supports service period based coordinated spatial reuse.

FIG. 10 shows an example of a process flow 1000 that supports service period based coordinated spatial reuse. The process flow 1000 includes a first wireless device 1002-*a* and a second wireless device 1002-*b*. For example, the first wireless device 1002-*a* may be an AP 102 or a STA 104 (such as a STA operating as a softAP) as illustrated by and described with reference to FIG. 1, and the second wireless device 1002-*b* may be an AP 102 or a STA 104 (such as a STA operating as a softAP) as illustrated by and described with reference to FIG. 1. For example, the first wireless device 1002-*a* may be a wireless device 502-*a*, a wireless device 602-*a*, a wireless device 702-*a*, a wireless device 802-*a* or a wireless device 902-*a* as illustrated by and described with reference to FIGS. 5, 6, 7, 8, and 9, respectively. The second wireless device 1002-*b* may be a wireless device 502-*b*, a wireless device 602-*b*, a wireless device 702-*b*, a wireless device 802-*b* or a wireless device 902-*b* as illustrated by and described with reference to FIGS. 5, 6, 7, 8, and 9, respectively. The process flow also includes a first client wireless device 1004-*a* and a second client wireless device 1004-*b*. For example, the first client wireless device 1004-*a* and the second client wireless device 1004-*b* may be STAs 104 as illustrated by and described with reference to FIG. 1. For example, the first client wireless device 1004-*a* may be a client wireless device 504-*a*, a client wireless device 604-*a*, a client wireless device 704-*a*, a client wireless device 804-*a*, or a client wireless device 904-*a* as illustrated by and described with reference to FIGS. 5, 6, 7, 8, and 9, respectively. The second client wireless device 1004-*b* may be a client wireless device 504-*b*, a client wireless device 604-*b*, a client wireless device 704-*b*, a client wireless device 804-*b*, or a client wireless device 904-*b* as illustrated by and described with reference to FIGS. 5, 6, 7, 8, and 9, respectively. For example, the first wireless device 1002-*a* and the first client wireless device 1004-*a* may be associated with a first BSS, and the second wireless device 1002-*b* and the second client wireless device 1004-*b* may be associated with a second BSS. In the following description of the process flow 1000, the operations between the first wireless device 1002-*a*, the second wireless device 1002-*b*, the first client wireless device 1004-*a*, and the second client wireless device 1004-*b* may be transmitted in a different order than the example order shown, or the operations performed by the first wireless device 1002-*a*, the second wireless device 1002-*b*, the first client wireless device 1004-*a*, and the second client wireless device 1004-*b* may be performed in different orders or at different times. Some operations also may be omitted from the process flow 1000, and other operations may be added to the process flow 1000.

At 1006, the first wireless device 1002-*a* may transmit a first control message to the second wireless device 1002-*b*, the first control message indicating one or more service periods designated for spatial reuse and an interference threshold associated with the one or more service periods. For example, the first control message may be a beacon 720, a beacon 820, or a beacon 920 as illustrated by and described with reference to FIGS. 7, 8, and 9, respectively. Service periods designated for spatial reuse also may be referred to as spatial reuse service periods.

At 1008, the second wireless device 1002-*b* may transmit a first control message to one or more client wireless devices (including the second client wireless device 1004-*b*) in the second BSS that indicates the one or more service periods designated for spatial reuse and the interference threshold associated with the one or more service periods.

At 1010, during a first service period of the one or more service periods designated for spatial reuse, the first wireless device 1002-*a* may transmit a second control message. The second control message may be received by the second wireless device 1002-*b* or the first client wireless device 1004-*a*.

At 1012, the first wireless device 1002-*a* may communicate, during the first service period, with one or more client wireless devices (including the first client wireless device 1004-*a*) in the first BSS, where respective transmission powers of the communication in accordance with the interference threshold. In some examples, the one or more client wireless devices satisfy an MCS threshold or SINR threshold (such as are in the inner zone 508-*a*, 608-*a*, 708-*a*, 808-*a*, or 908-*a*, as illustrated by and described with reference to FIGS. 5, 6, 7, 8, and 9, respectively). In some examples, the first wireless device 1002-*a* may communicate with one or more other client wireless devices that do not satisfy the MCS threshold or SINR threshold (such as are in an outer zone 510-*a*, 610-*a*, 710-*a*, 810-*a*, or 910-*a*, as illustrated by and described with reference to FIGS. 5, 6, 7, 8, and 9, respectively) in another service period that is not designated for spatial reuse.

At 1014, the second wireless device 1002-*b* may communicate, during the first service period, with one or more client wireless devices (including the second client wireless device 1004-*b*) in the second BSS, where respective transmission powers of the communication are in accordance with the interference threshold and a pathloss associated with the second control message. The communications at 1014 may be concurrent or overlapping with the communications at 1012.

For example, for downlink/downlink scenarios (such as when the first service period is a downlink/downlink spatial reuse service period), the second control message may be a MU-RTS message, and the second wireless device 1002-*b* may calculate, determine, obtain, ascertain or select the RSSIs of CTS messages transmitted by client wireless devices of the first wireless device 1002-*a* in response to the MU-RTS message. The second wireless device 1002-*b* may calculate, determine, obtain, ascertain or select a pathloss PLx in accordance with the RSSIs of the CTS messages, and the respective transmission powers of the communication at 1014 may be associated with the pathloss PLx and the interference threshold (CSR_DL_P).

As another example, for uplink/uplink scenarios (such as when the first service period is an uplink/uplink spatial reuse service period), the second control message may be an uplink grant for one or more client wireless devices in the first BSS that the second wireless device 1002-*b* may forward to the second client wireless device 1004-*b*. The second client wireless device 1004-*b* may measure an RSSI of the uplink grant to calculate, determine, obtain, ascertain or select the pathloss PLx, and the uplink transmission power at 1014 may be associated with the pathloss PLx and the interference threshold (CSR_UL_P).

As another example, for uplink/downlink scenarios (such as when the first service period is used for downlink by the first BSS and uplink by the second BSS), the second wireless device 1002-*b* may calculate, determine, obtain, ascertain or select a pathloss PLx between the first wireless device 1002-*a* and the second wireless device 1002-*b* in accordance with a beacon transmission power, and the second wireless device 1002-*b* may indicate in a beacon a maximum allowed uplink transmission power in accordance with the calculated, determined, obtained, ascertained or selected PLx and the indicated interference threshold (CSR_P) and a pathloss criteria (such as when PL2<threshold) for client wireless devices in the second BSS. Client wireless devices in the second BSS may calculate, determine, ascertain or select whether the pathloss criteria is satisfied, and if so, may transmit uplink communications for the second wireless device 1002-*b* at 1014 in the first service period while the first wireless device 1002-*a* may transmit downlink communications to client wireless devices at 1012 in the first service period.

Figure 11:
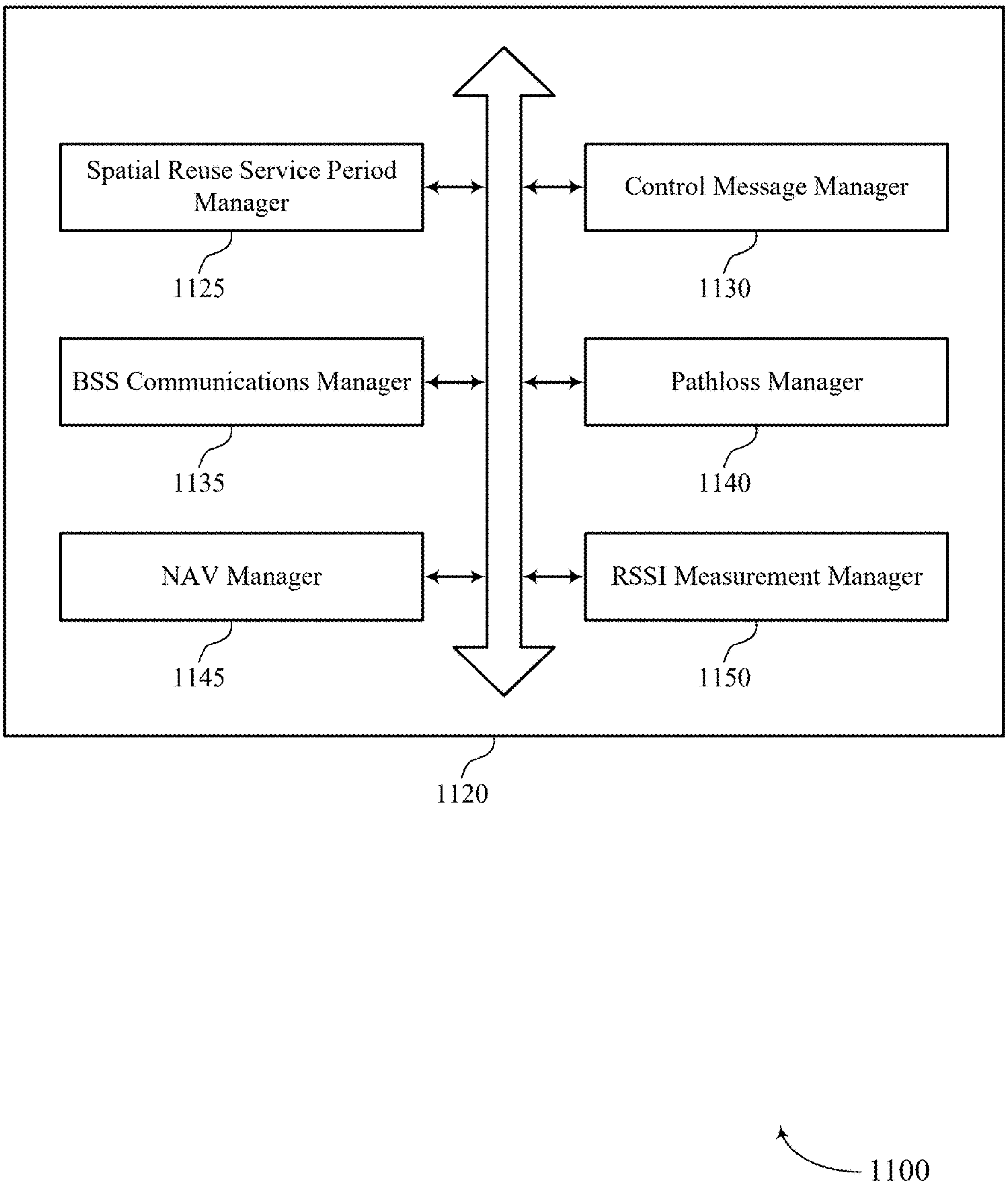
FIG. 11 shows a block diagram of an example wireless communication device that supports service period based coordinated spatial reuse.

FIG. 11 shows a block diagram of an example wireless communication device 1100 that supports service period based coordinated spatial reuse. In some examples, the wireless communication device 1100 is configured to perform the process 1200, the process 1300, and the process 1400 described with reference to FIGS. 12, 13, and 14, respectively. The wireless communication device 1100 may include one or more chips, SoCs, chipsets, packages, components or devices that individually or collectively constitute or include a processing system. The processing system may interface with other components of the wireless communication device 1100, and may generally process information (such as inputs or signals) received from such other components and output information (such as outputs or signals) to such other components. In some aspects, an example chip may include a processing system, a first interface to output or transmit information and a second interface to receive or obtain information. For example, the first interface may refer to an interface between the processing system of the chip and a transmission component, such that the wireless communication device 1100 may transmit the information output from the chip. In such an example, the second interface may refer to an interface between the processing system of the chip and a reception component, such that the wireless communication device 1100 may receive information that is then passed to the processing system. In some such examples, the first interface also may obtain information, such as from the transmission component, and the second interface also may output information, such as to the reception component.

The processing system of the wireless communication device 1100 includes processor (or "processing") circuitry in the form of one or multiple processors, microprocessors, processing units (such as central processing units (CPUs), graphics processing units (GPUs) or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. The processing system may further include memory circuitry in the form of one or more memory devices, memory blocks, memory elements or other discrete gate or transistor logic or circuitry, each of which may include tangible storage media such as random-access memory (RAM) or ROM, or combinations thereof (all of which may be generally referred to herein individually as "memories" or collectively as "the memory" or "the memory circuitry"). One or more of the memories may be coupled with one or more of the processors and may individually or collectively store processor-executable code that, when executed by one or more of the processors, may configure one or more of the processors to perform various functions or operations described herein. Additionally, or alternatively, in some examples, one or more of the processors may be preconfigured to perform various functions or operations described herein without requiring configuration by software. The processing system may further include or be coupled with one or more modems (such as a Wi-Fi (for example, IEEE compliant) modem or a cellular (such as a 3GPP 4G LTE, 5G or 6G compliant) modem). In some implementations, one or more processors of the processing system include or implement one or more of the modems. The processing system may further include or be coupled with multiple radios (collectively "the radio"), multiple RF chains or multiple transceivers, each of which may in turn be coupled with one or more of multiple antennas. In some implementations, one or more processors of the processing system include or implement one or more of the radios, RF chains or transceivers.

In some examples, the wireless communication device 1100 can configurable or configured for use in an AP or STA (such as a STA operating as a softAP), such as the AP 102 or the STA 104 described with reference to FIG. 1. In some other examples, the wireless communication device 1100 can be an AP or STA that includes such a processing system and other components including multiple antennas. The wireless communication device 1100 is capable of transmitting and receiving wireless communications in the form of, for example, wireless packets. For example, the wireless communication device 1100 can be configurable or configured to transmit and receive packets in the form of physical layer PPDUs and MPDUs conforming to one or more of the IEEE 802.11 family of wireless communication protocol standards. In some other examples, the wireless communication device 1100 can be configurable or configured to transmit and receive signals and communications conforming to one or more 3GPP specifications including those for 5G NR or 6G. In some examples, the wireless communication device 1100 also includes or can be coupled with one or more application processors which may be further coupled with one or more other memories. In some examples, the wireless communication device 1100 further includes a user interface (UI) (such as a touchscreen or keypad) and a display, which may be integrated with the UI to form a touchscreen display that is coupled with the processing system. In some examples, the wireless communication device 1100 may further include one or more sensors such as, for example, one or more inertial sensors, accelerometers, temperature sensors, pressure sensors, or altitude sensors, that are coupled with the processing system. In some examples, the wireless communication device 1100 further includes at least one external network interface coupled with the processing system that enables communication with a core network or backhaul network that enables the wireless communication device 1100 to gain access to external networks including the Internet.

The communications manager 1120 may support wireless communications at a wireless communications device in accordance with examples as disclosed herein. The wireless communication device 1100 includes a spatial reuse service period manager 1125, a control message manager 1130, an BSS communications manager 1135, a pathloss manager 1140, a NAV manager 1145, and an RSSI measurement manager 1150. Portions of one or more of the spatial reuse service period manager 1125, the control message manager 1130, the BSS communications manager 1135, the pathloss manager 1140, the NAV manager 1145, and the RSSI measurement manager 1150 may be implemented at least in part in hardware or firmware. For example, one or more of the spatial reuse service period manager 1125, the control message manager 1130, the BSS communications manager 1135, the pathloss manager 1140, the NAV manager 1145, and the RSSI measurement manager 1150 may be implemented at least in part by at least a processor or a modem. In some examples, portions of one or more of the spatial reuse service period manager 1125, the control message manager 1130, the BSS communications manager 1135, the pathloss manager 1140, the NAV manager 1145, and the RSSI measurement manager 1150 may be implemented at least in part by a processor and software in the form of processor-executable code stored in memory.

The wireless communication device 1100 may support wireless communications in accordance with examples as disclosed herein. The spatial reuse service period manager 1125 is configurable or configured to transmit, to a second wireless device associated with a second BSS, a first control message indicating one or more service periods designated for spatial reuse or one or more TXOPs designated for spatial reuse and an interference threshold associated with the one or more service periods or the one or more TXOPs. The control message manager 1130 is configurable or configured to transmit, during a first service period of the one or more service periods or during a first TXOP of the one or more TXOPs, a second control message to one or more third wireless devices associated with the first BSS, the second control message includes an indication of service for the one or more third wireless devices. The BSS communications manager 1135 is configurable or configured to communicate, during the first service period or during the first TXOP, with the one or more third wireless devices, where respective transmission powers of the communication are in accordance with the interference threshold.

In some examples, the one or more third wireless devices satisfy a MCS threshold.

In some examples, the BSS communications manager 1135 is configurable or configured to communicate, during a second service period and used an MCS below the MCS threshold, with one or more fourth wireless devices associated with the first BSS, where the second service period is different than the one or more service periods designated for spatial reuse, and where the second service period is subsequent to the first service period and prior to a third service period of the one or more service periods designated for spatial reuse.

In some examples, the BSS communications manager 1135 is configurable or configured to tag the one or more third wireless devices as inner client devices; and tag the one or more fourth wireless devices as outer client devices, where the one or more service periods designated for spatial reuse are associated with communication with the inner client devices, and where the second service period is associated with communication with the outer client devices.

In some examples, the interference threshold are in accordance with a maximum pathloss between the first wireless device and the one or more third wireless devices and a maximum transmission power of the respective transmission powers.

In some examples, to support transmitting the second control message, the control message manager 1130 is configurable or configured to transmit a multi-user request to send message, where communicating with the one or more third wireless devices includes transmitting one or more respective downlink data communications to the one or more third wireless devices.

In some examples, the BSS communications manager 1135 is configurable or configured to receive, in response to the multi-user request to send message, one or more respective clear to send messages from the one or more third wireless devices, where transmission of the one or more respective downlink data communications is responsive to a reception of the one or more respective clear to send messages.

In some examples, to support transmitting the second control message, the control message manager 1130 is configurable or configured to transmit an uplink grant to the one or more third wireless devices, where communicating with the one or more third wireless devices includes receiving one or more respective uplink data communications from the one or more third wireless devices.

In some examples, the first control message indicate one of a downlink or an uplink direction of data communications associated with each of the one or more service periods designated for spatial reuse.

Additionally, or alternatively, the wireless communication device 1100 may support wireless communications in accordance with examples as disclosed herein. In some examples, the spatial reuse service period manager 1125 is configurable or configured to receive, from a first wireless device associated with a first BSS, a first control message indicating one or more service periods designated for spatial reuse or one or more TXOPs designated for spatial reuse and an interference threshold associated with the one or more service periods or the one or more TXOPs designated for spatial reuse. In some examples, the control message manager 1130 is configurable or configured to receive, from the first wireless device during a first service period of the one or more service periods or during a first TXOP of the one or more TXOPs, a second control message. In some examples, the BSS communications manager 1135 is configurable or configured to communicate, during the first service period or during the first TXOP, with one or more third wireless devices, where respective transmission powers of the communication are in accordance with the interference threshold and a pathloss associated with the second control message.

In some examples, the control message manager 1130 is configurable or configured to receive one or more respective clear to send messages from one or more fourth wireless devices associated with the first BSS, where the second control message is a multi-user request to send message, and where the one or more respective clear to send messages are responsive to the multi-user request to send message, where the pathloss associated with the second control message is identified from one or more respective pathlosses associated with the one or more respective clear to send messages, and where communicating with the one or more third wireless devices includes transmitting one or more respective downlink data communications to the one or more third wireless devices.

In some examples, the pathloss manager 1140 is configurable or configured to receive an indication of one or more respective pathlosses between the first wireless device and the one or more third wireless devices, where the maximum pathloss is identified from the one or more respective pathlosses.

In some examples, the pathloss manager 1140 is configurable or configured to measure one or more respective RSSIs of the one or more respective clear to send messages, where the one or more respective pathlosses are associated with the one or more respective RSSIs and a reference transmission power indicated in the first control message.

In some examples, the control message manager 1130 is configurable or configured to receive, from the first wireless device, an uplink grant for one or more fourth wireless devices associated with the first BSS, where the second control message is the uplink grant. In some examples, the control message manager 1130 is configurable or configured to forward, to the one or more third wireless devices, the uplink grant.

In some examples, the pathloss manager 1140 is configurable or configured to measure a transmission power of the second control message, where the pathloss associated with the second control message is associated with the transmission power. In some examples, the BSS communications manager 1135 is configurable or configured to transmit, to the one or more third wireless devices, a maximum transmission power for the first service period in accordance with the transmission power and the interference threshold, where communicating with the one or more third wireless devices includes receiving one or more respective uplink data communications from the one or more third wireless devices, and where the respective transmission powers of the communication are less than or equal to the maximum transmission power.

In some examples, the NAV manager 1145 is configurable or configured to receive, from the first wireless device, an indication of a first network allocation vector associated with first BSS for the first service period, where communicating with the one or more third wireless devices is in accordance with a second network allocation vector associated with the second BSS.

In some examples, the first control message indicate one of a downlink or an uplink direction of data communications associated with each of the one or more service periods designated for spatial reuse.

In some examples, the BSS communications manager 1135 is configurable or configured to communicate with the one or more third wireless devices during a second service period, where the second service period is different than the one or more service periods designated for spatial reuse, and where the second service period is subsequent to the first service period and prior to a third service period of the one or more service periods designated for spatial reuse.

In some examples, the control message manager 1130 is configurable or configured to transmit, to the one or more third wireless devices, a third control message in response to the first control message and prior to the first service period, the third control message indicating the one or more service periods designated for spatial reuse.

Additionally, or alternatively, the wireless communication device 1100 may support wireless communications in accordance with examples as disclosed herein. In some examples, the spatial reuse service period manager 1125 is configurable or configured to receive, from a second wireless device associated with the second BSS, a first control message indicating one or more service periods designated for spatial reuse or one or more TXOPs designated for spatial reuse with a first wireless device associated with a first BSS and an interference threshold associated with the one or more service periods or the one or more TXOPs designated for spatial reuse. In some examples, the BSS communications manager 1135 is configurable or configured to communicate with the second wireless device during a first service period of the one or more service periods or during a first TXOP of the one or more TXOPs, where a transmission power of the communication is in accordance with the interference threshold.

In some examples, the control message manager 1130 is configurable or configured to receive, during the first service period, a forwarded uplink grant from the first wireless device for one or more fourth wireless devices associated with the first BSS, where the transmission power is associated with the forwarded uplink grant, and where communicating with the second wireless device includes transmitting an uplink communication to the second wireless device.

In some examples, the RSSI measurement manager 1150 is configurable or configured to measure an RSSI of the forwarded uplink grant, where the transmission power is determined in accordance with the RSSI.

In some examples, the control message manager 1130 is configurable or configured to receive, from the second wireless device during the first service period, a second control message indicating maximum transmission power for the first service period, where communicating with the second wireless device includes transmitting an uplink communication to the second wireless device, and where the transmission power is less than or equal to the maximum transmission power.

In some examples, to support communicating with the second wireless device, the BSS communications manager 1135 is configurable or configured to receive a downlink data communication.

In some examples, the first control message indicate one of a downlink or an uplink direction of data communications associated with each of the one or more service periods designated for spatial reuse.

In some examples, the BSS communications manager 1135 is configurable or configured to communicate with the second wireless device during a second service period, where the second service period is different than the one or more service periods designated for spatial reuse, and where the second service period is subsequent to the first service period and prior to a third service period of the one or more service periods designated for spatial reuse.

Figure 12:
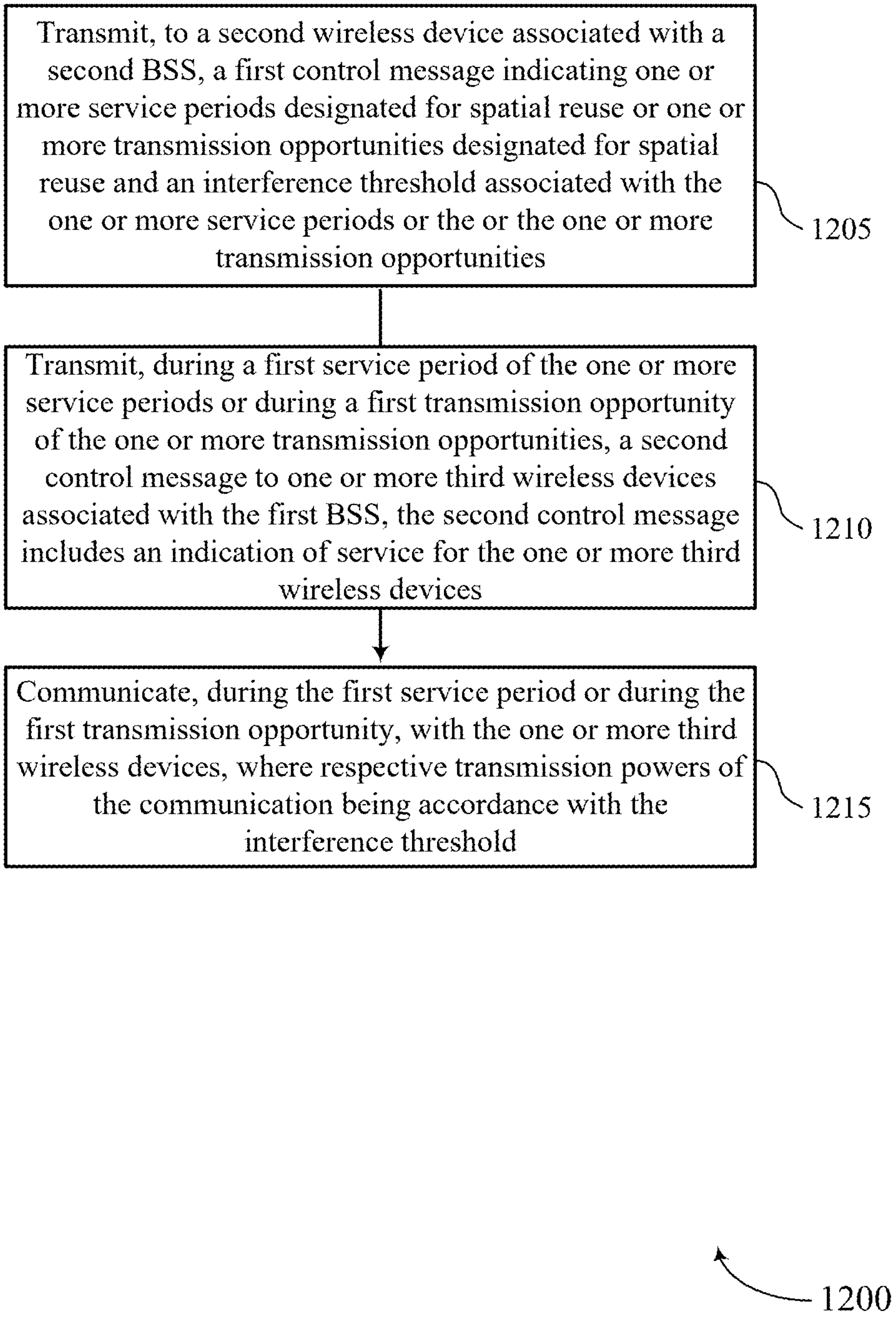
FIG. 12 shows a flowchart illustrating an example process performable by or at a first wireless device associated with a first basic service set (BSS) that supports service period based coordinated spatial reuse.

FIG. 12 shows a flowchart illustrating an example process 1200 performable by or at a first wireless device associated with a first BSS that supports service period based coordinated spatial reuse. The operations of the process 1200 may be implemented by a first wireless device associated with a first BSS or its components as described herein. For example, the process 1200 may be performed by a wireless communication device, such as the wireless communication device 1100 described with reference to FIG. 11, operating as or within a wireless AP or a wireless STA (such as a STA operating as a softAP). In some examples, the process 1200 may be performed by a wireless AP or a wireless STA, such as one of the APs 102 or the STAs 104 described with reference to FIG. 1.

In some examples, in block 1205, the first wireless device associated with a first BSS may transmit, to a second wireless device associated with a second BSS, a first control message indicating one or more service periods designated for spatial reuse or one or more TXOPs designated for spatial reuse and an interference threshold associated with the one or more service periods or the one or more TXOPs. The operations of block 1205 may be performed in accordance with examples as disclosed herein. In some implementations, aspects of the operations of block 1205 may be performed by a spatial reuse service period manager 1125 as described with reference to FIG. 11.

In some examples, in block 1210, the first wireless device associated with a first BSS may transmit, during a first service period of the one or more service periods or during a first TXOP of the one or more TXOPs, a second control message to one or more third wireless devices associated with the first BSS, the second control message includes an indication of service for the one or more third wireless devices. The operations of block 1210 may be performed in accordance with examples as disclosed herein. In some implementations, aspects of the operations of block 1210 may be performed by a control message manager 1130 as described with reference to FIG. 11.

In some examples, in block 1215, the first wireless device associated with a first BSS may communicate, during the first service period or during the first TXOP, with the one or more third wireless devices, where respective transmission powers of the communication are in accordance with the interference threshold. The operations of block 1215 may be performed in accordance with examples as disclosed herein. In some implementations, aspects of the operations of block 1215 may be performed by an BSS communications manager 1135 as described with reference to FIG. 11.

Figure 13:
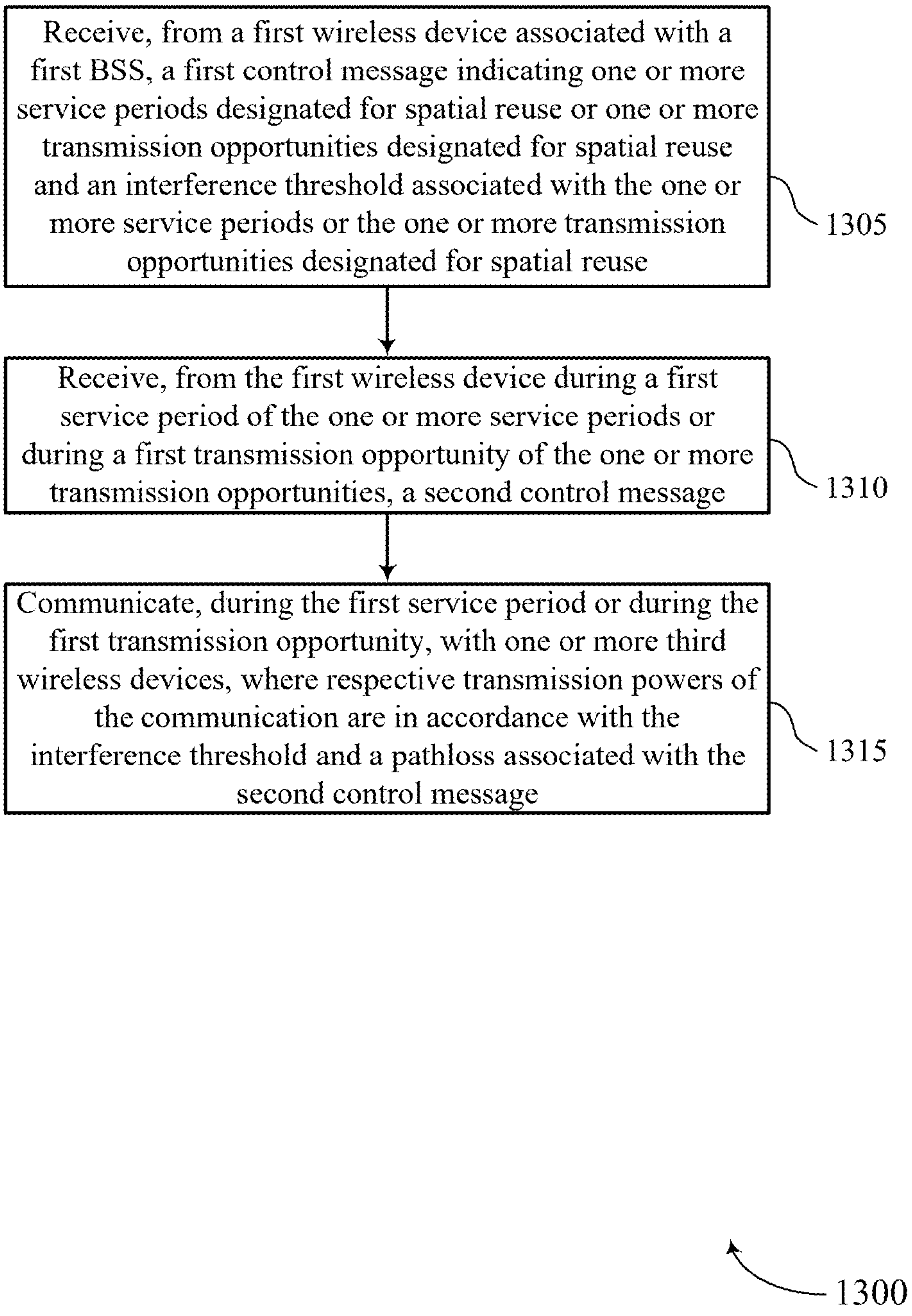
FIG. 13 shows a flowchart illustrating an example process performable by or at a second wireless device associated with a second BSS that supports service period based coordinated spatial reuse.

FIG. 13 shows a flowchart illustrating a process 1300 that supports service period based coordinated spatial reuse. The operations of the process 1300 may be implemented by or at a second wireless device associated with a second BSS or its components as described herein. For example, the operations of the process 1300 may be performed by a wireless communication device, such as the wireless communication device 1100 described with reference to FIG. 11, operating as or within a wireless AP or a wireless STA (such as a STA operating as a softAP). In some examples, the process 1300 may be performed by a wireless AP or a wireless STA, such as one of the APs 102 or the STAs 104 described with reference to FIG. 1.

In some examples, in block 1305, the method may include receiving, from a first wireless device associated with a first BSS, a first control message indicating one or more service periods designated for spatial reuse or one or more TXOPs designated for spatial reuse and an interference threshold associated with the one or more service periods or the one or more TXOPs designated for spatial reuse. In some implementations, aspects of the operations of block 1305 may be performed in accordance with examples as disclosed herein.

In some examples, in block 1310, the method may include receiving, from the first wireless device during a first service period of the one or more service periods or during a first TXOP of the one or more TXOPs, a second control message. In some implementations, aspects of the operations of block 1310 may be performed in accordance with examples as disclosed herein.

In some examples, in block 1315, the method may include communicating, during the first service period or during the first TXOP, with one or more third wireless devices, where respective transmission powers of the communication are in accordance with the interference threshold and a pathloss associated with the second control message. In some implementations, aspects of the operations of block 1315 may be performed in accordance with examples as disclosed herein.

Figure 14:
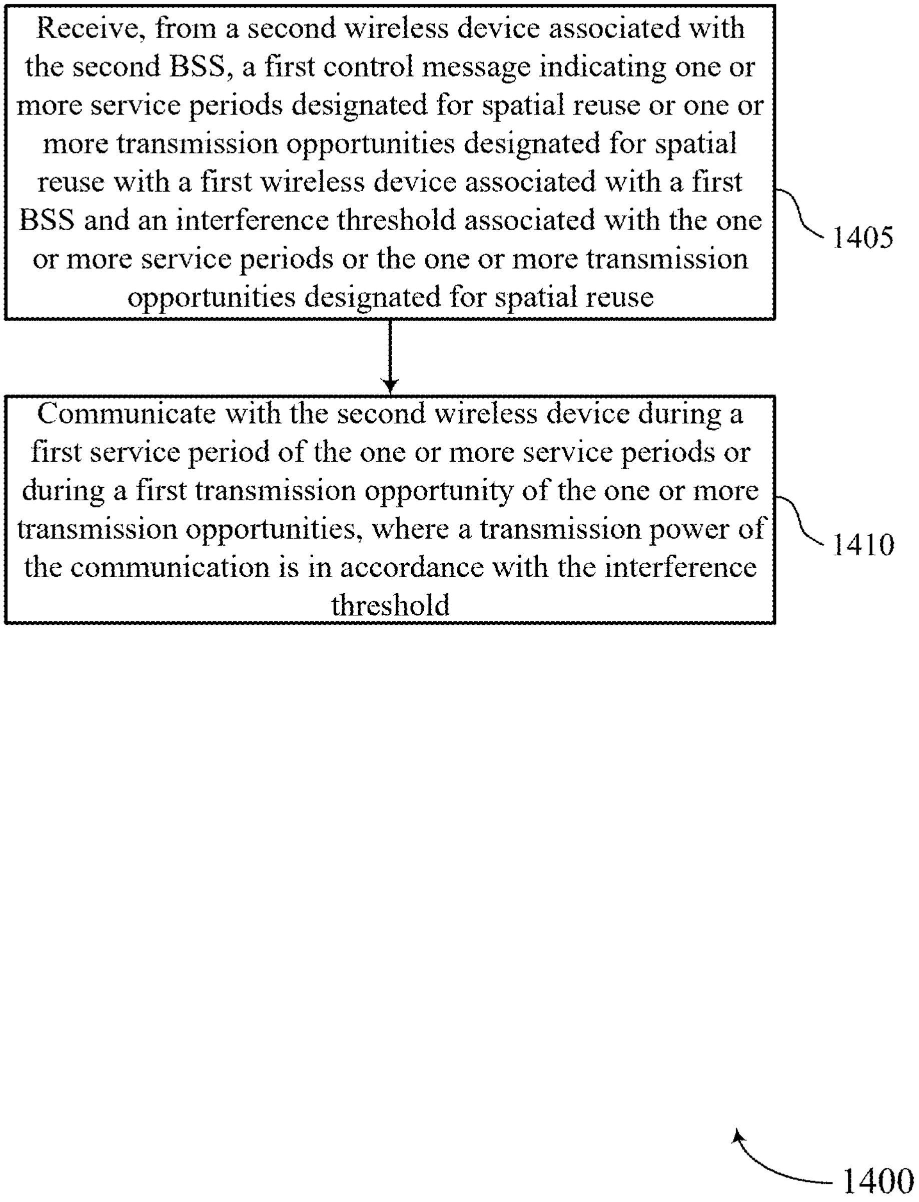
FIG. 14 shows a flowchart illustrating an example process performable by or at a third wireless device associated with a second BSS that supports service period based coordinated spatial reuse.

FIG. 14 shows a flowchart illustrating an example process 1400 performable by or at a third wireless device associated with a second BSS that supports service period based coordinated spatial reuse. The operations of the process 1400 may be implemented by a third wireless device associated with a second BSS or its components as described herein. For example, the process 1400 may be performed by a wireless communication device, such as the wireless communication device 1100 described with reference to FIG. 11, operating as or within a wireless AP or a wireless STA. In some examples, the process 1400 may be performed by a wireless AP or a wireless STA, such as one of the APs 102 or the STAs 104 described with reference to FIG. 1.

In some examples, in block 1405, the third wireless device associated with a second BSS may receive, from a second wireless device associated with the second BSS, a first control message indicating one or more service periods designated for spatial reuse or one or more TXOPs designated for spatial reuse with a first wireless device associated with a first BSS and an interference threshold associated with the one or more service periods or the one or more TXOPs designated for spatial reuse. The operations of block 1405 may be performed in accordance with examples as disclosed herein. In some implementations, aspects of the operations of block 1405 may be performed by a spatial reuse service period manager 1125 as described with reference to FIG. 11.

In some examples, in block 1410, the third wireless device associated with a second BSS may communicate with the second wireless device during a first service period of the one or more service periods or during a first TXOP of the one or more TXOPs, where a transmission power of the communication is in accordance with the interference threshold. The operations of block 1410 may be performed in accordance with examples as disclosed herein. In some implementations, aspects of the operations of block 1410 may be performed by an BSS communications manager 1135 as described with reference to FIG. 11.

Implementation examples are described in the following numbered clauses:

Aspect 1: A method for wireless communications by a first wireless device associated with a first BSS, including:

transmitting, to a second wireless device associated with a second BSS, a first control message indicating one or more service periods designated for spatial reuse or one or more TXOPs designated for spatial reuse and an interference threshold associated with the one or more service periods or the one or more TXOPs; transmitting, during a first service period of the one or more service periods or during a first TXOP of the one or more TXOPs, a second control message to one or more third wireless devices associated with the first BSS, the second control message includes an indication of service for the one or more third wireless devices; and communicating, during the first service period, with the one or more third wireless devices, where respective transmission powers of the communication are in accordance with the interference threshold.

Aspect 2: The method of aspect 1, where the one or more third wireless devices satisfy a MCS threshold.

Aspect 3: The method of aspect 2, further including: communicating, during a second service period and using a MCS below the MCS threshold, with one or more fourth wireless devices associated with the first BSS, where the second service period is different than the one or more service periods designated for spatial reuse, and where the second service period is subsequent to the first service period and prior to a third service period of the one or more service periods designated for spatial reuse.

Aspect 4: The method of aspect 3, further including: tagging the one or more third wireless devices as inner client devices; and tagging the one or more fourth wireless devices as outer client devices, where the one or more service periods designated for spatial reuse are associated with communication with the inner client devices, and where the second service period is associated with communication with the outer client devices.

Aspect 5: The method of any of aspects 1-4, where the interference threshold is in accordance with a maximum pathloss between the first wireless device and the one or more third wireless devices and a maximum transmission power of the respective transmission powers.

Aspect 6: The method of aspect 5, further including: receiving an indication of one or more respective pathlosses between the first wireless device and the one or more third wireless devices, where the maximum pathloss is identified from the one or more respective pathlosses.

Aspect 7: The method of any of aspects 1-6, where transmitting the second control message includes: transmitting a MU-RTS message, where communicating with the one or more third wireless devices includes transmitting one or more respective downlink data communications to the one or more third wireless devices.

Aspect 8: The method of aspect 7, further including: receiving, in response to the MU-RTS message, one or more respective CTS messages from the one or more third wireless devices, where transmission of the one or more respective downlink data communications is responsive to a reception of the one or more respective CTS messages.

Aspect 9: The method of any of aspects 1-6, where transmitting the second control message includes: transmitting an uplink grant to the one or more third wireless devices, where communicating with the one or more third wireless devices includes receiving one or more respective uplink data communications from the one or more third wireless devices.

Aspect 10: The method of any of aspects 1-9, where the first control message indicates one of a downlink or an uplink direction of data communications associated with each of the one or more service periods designated for spatial reuse.

Aspect 11: A method for wireless communications by a second wireless device associated with a second BSS, including: receiving, from a first wireless device associated with a first BSS, a first control message indicating one or more service periods designated for spatial reuse or one or more TXOPs designated for spatial reuse and an interference threshold associated with the one or more service periods or the one or more TXOPs designated for spatial reuse; receiving, from the first wireless device during a first service period of the one or more service periods or during a first TXOP of the one or more TXOPs, a second control message; and communicating, during the first service period, with one or more third wireless devices, where respective transmission powers of the communication are in accordance with the interference threshold and a pathloss associated with the second control message.

Aspect 12: The method of aspect 11, further including: receiving one or more respective CTS messages from one or more fourth wireless devices associated with the first BSS, where the second control message is a MU-RTS message, and where the one or more respective CTS messages are responsive to the MU-RTS message, where the pathloss associated with the second control message is identified from one or more respective pathlosses associated with the one or more respective CTS messages, and where communicating with the one or more third wireless devices includes transmitting one or more respective downlink data communications to the one or more third wireless devices.

Aspect 13: The method of aspect 12, further including: measuring one or more respective RSSIs of the one or more respective CTS messages, where the one or more respective pathlosses are associated with the one or more respective RSSIs and a reference transmission power indicated in the first control message.

Aspect 14: The method of aspect 11, further including: receiving, from the first wireless device, an uplink grant for one or more fourth wireless devices associated with the first BSS, where the second control message is the uplink grant; and forwarding, to the one or more third wireless devices, the uplink grant.

Aspect 15: The method of aspect 11, further including: measuring a transmission power of the second control message, where the pathloss associated with the second control message is associated with the transmission power; and transmitting, to the one or more third wireless devices, a maximum transmission power for the first service period in accordance with the transmission power and the interference threshold, where communicating with the one or more third wireless devices includes receiving one or more respective uplink data communications from the one or more third wireless devices, and where the respective transmission powers of the communication are less than or equal to the maximum transmission power.

Aspect 16: The method of any of aspects 11-15, further including: receiving, from the first wireless device, an indication of a first network allocation vector associated with first BSS for the first service period, where communicating with the one or more third wireless devices is in accordance with a second network allocation vector associated with the second BSS.

Aspect 17: The method of any of aspects 11-16, where the first control message indicates one of a downlink or an uplink direction of data communications associated with each of the one or more service periods designated for spatial reuse.

Aspect 18: The method of any of aspects 11-17, further including: communicating with the one or more third wireless devices during a second service period, where the second service period is different than the one or more service periods designated for spatial reuse, and where the second service period is subsequent to the first service period and prior to a third service period of the one or more service periods designated for spatial reuse.

Aspect 19: The method of any of aspects 11-18, further including: transmitting, to the one or more third wireless devices, a third control message in response to the first control message and prior to the first service period, the third control message indicating the one or more service periods designated for spatial reuse.

Aspect 20: A method for wireless communications by a third wireless device associated with a second BSS, including: receiving, from a second wireless device associated with the second BSS, a first control message indicating one or more service periods designated for spatial reuse or one or more TXOPs designated for spatial reuse with a first wireless device associated with a first BSS and an interference threshold associated with the one or more service periods or the one or more TXOPs designated for spatial reuse; and communicating with the second wireless device during a first service period of the one or more service periods or during a first TXOP of the one or more TXOPs, where a transmission power of the communication is in accordance with the interference threshold.

Aspect 21: The method of aspect 20, further including: receiving, during the first service period, a forwarded uplink grant from the first wireless device for one or more fourth wireless devices associated with the first BSS, where the transmission power is associated with the forwarded uplink grant, and where communicating with the second wireless device includes transmitting an uplink communication to the second wireless device.

Aspect 22: The method of aspect 21, further including: measuring a RSSI of the forwarded uplink grant, where the transmission power is determined in accordance with the RSSI.

Aspect 23: The method of aspect 20, further including: receiving, from the second wireless device during the first service period, a second control message indicating maximum transmission power for the first service period, where communicating with the second wireless device includes transmitting an uplink communication to the second wireless device, and where the transmission power is less than or equal to the maximum transmission power.

Aspect 24: The method of aspect 20, where communicating with the second wireless device includes: receiving a downlink data communication.

Aspect 25: The method of any of aspects 20-24, where the first control message indicates one of a downlink or an uplink direction of data communications associated with each of the one or more service periods designated for spatial reuse.

Aspect 26: The method of any of aspects 20-25, further including: communicating with the second wireless device during a second service period, where the second service period is different than the one or more service periods designated for spatial reuse, and where the second service period is subsequent to the first service period and prior to a third service period of the one or more service periods designated for spatial reuse.

Aspect 27: A first wireless device associated with a first BSS, including a processing system that includes processor circuitry and memory circuitry that stores code, the processing system configured to cause the first wireless device to perform a method of any of aspects 1-10.

Aspect 28: A first wireless device associated with a first BSS for wireless communications, including at least one means for performing a method of any of aspects 1-10.

Aspect 29: A non-transitory computer-readable medium storing code for wireless communications, the code including instructions executable by a processor to perform a method of any of aspects 1-10.

Aspect 30: A second wireless device associated with a second BSS, including a processing system that includes processor circuitry and memory circuitry that stores code, the processing system configured to cause the first wireless device to perform a method of any of aspects 11-19.

Aspect 31: A second wireless device associated with a second BSS for wireless communications, including at least one means for performing a method of any of aspects 11-19.

Aspect 32: A non-transitory computer-readable medium storing code for wireless communications, the code including instructions executable by a processor to perform a method of any of aspects 11-19.

Aspect 33: A third wireless device associated with a second BSS, including a processing system that includes processor circuitry and memory circuitry that stores code, the processing system configured to cause the first wireless device to perform a method of any of aspects 20-26.

Aspect 34: A third wireless device associated with a second BSS for wireless communications, including at least one means for performing a method of any of aspects 20-26.

Aspect 35: A non-transitory computer-readable medium storing code for wireless communications, the code including instructions executable by a processor to perform a method of any of aspects 20-26.

As used herein, the term "determine" or "determining" encompasses a wide variety of actions and, therefore, "determining" can include calculating, computing, processing, deriving, estimating, investigating, looking up (such as via looking up in a table, a database, or another data structure), inferring, ascertaining, or measuring, among other possibilities. Also, "determining" can include receiving (such as receiving information), accessing (such as accessing data stored in memory) or transmitting (such as transmitting information), among other possibilities. Additionally, "determining" can include resolving, selecting, obtaining, choosing, establishing and other such similar actions.

As used herein, the term "communicate" refers to transmitting, receiving, or concurrently transmitting and receiving.

As used herein, a phrase referring to "at least one of" or "one or more of" a list of items refers to any combination of those items, including single members. As an example, "at least one of: a, b, or c" is intended to cover: a, b, c, a-b, a-c, b-c, and a-b-c. As used herein, "or" is intended to be interpreted in the inclusive sense, unless otherwise explicitly indicated. For example, "a or b" may include a only, b only, or a combination of a and b. Furthermore, as used herein, a phrase referring to "a" or "an" element refers to one or more of such elements acting individually or collectively to perform the recited function(s). Additionally, a "set" refers to one or more items, and a "subset" refers to less than a whole set, but non-empty.

As used herein, "based on" is intended to be interpreted in the inclusive sense, unless otherwise explicitly indicated. For example, "based on" may be used interchangeably with "based at least in part on," "associated with," "in association with," or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions, or information.

The various illustrative components, logic, logical blocks, modules, circuits, operations, and algorithm processes described in connection with the examples disclosed herein may be implemented as electronic hardware, firmware, software, or combinations of hardware, firmware, or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the examples described in this disclosure may be readily apparent to persons having ordinary skill in the art, and the generic principles defined herein may be applied to other examples without departing from the spirit or scope of this disclosure. Thus, the claims are not intended to be limited to the examples shown herein, but are to be accorded the widest scope consistent with this disclosure, the principles and the novel features disclosed herein.

Additionally, various features that are described in this specification in the context of separate examples also can be implemented in combination in a single implementation. Conversely, various features that are described in the context of a single implementation also can be implemented in multiple examples separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

What is claimed is:

1. A first wireless device associated with a first basic service set (BSS), comprising:

a processing system that includes processor circuitry and memory circuitry that stores code, the processing system configured to cause the first wireless device to:

transmit, to a second wireless device associated with a second BSS, a first control message indicating one or more service periods designated for spatial reuse or one or more transmission opportunities designated for spatial reuse and an interference threshold associated with the one or more service periods or the one or more transmission opportunities;

transmit, during a first service period of the one or more service periods or during a first transmission opportunity of the one or more transmission opportunities, a second control message to one or more third wireless devices associated with the first BSS, the second control message including an indication of service for the one or more third wireless devices; and communicate, during the first service period or during the first transmission opportunity, with the one or more third wireless devices, wherein respective transmission powers of the communication are in accordance with the interference threshold.

2. The first wireless device of claim 1, wherein the one or more third wireless devices satisfy a modulation and coding scheme (MCS) threshold.

3. The first wireless device of claim 2, wherein the processing system is further configured to cause the first wireless device to:

communicate, during a second service period and using an MCS below the MCS threshold, with one or more fourth wireless devices associated with the first BSS, wherein the second service period is different than the one or more service periods designated for spatial reuse, and wherein the second service period is subsequent to the first service period and prior to a third service period of the one or more service periods designated for spatial reuse.

4. The first wireless device of claim 3, wherein the processing system is further configured to cause the first wireless device to:

tag the one or more third wireless devices as inner client devices; and tag the one or more fourth wireless devices as outer client devices, wherein the one or more service periods designated for spatial reuse are associated with communication with the inner client devices, and wherein the second service period is associated with communication with the outer client devices.

5. The first wireless device of claim 1, wherein the interference threshold is in accordance with a maximum pathloss between the first wireless device and the one or more third wireless devices and a maximum transmission power of the respective transmission powers.

6. The first wireless device of claim 1, wherein, to transmit the second control message, the processing system is configured to cause the first wireless device to:

transmit a multi-user request to send message, wherein communicating with the one or more third wireless devices includes transmitting one or more respective downlink data communications to the one or more third wireless devices.

7. The first wireless device of claim 6, wherein the processing system is further configured to cause the first wireless device to:

receive, in response to the multi-user request to send message, one or more respective clear to send messages from the one or more third wireless devices, wherein transmission of the one or more respective downlink data communications is responsive to a reception of the one or more respective clear to send messages.

8. The first wireless device of claim 1, wherein, to transmit the second control message, the processing system is configured to cause the first wireless device to:

transmit an uplink grant to the one or more third wireless devices, wherein communicating with the one or more third wireless devices includes receiving one or more respective uplink data communications from the one or more third wireless devices.

9. The first wireless device of claim 1, wherein the first control message indicates one of a downlink or an uplink direction of data communications associated with each of the one or more service periods designated for spatial reuse.

10. A second wireless device associated with a second basic service set (BSS), comprising:

a processing system that includes processor circuitry and memory circuitry that stores code, the processing system configured to cause the second wireless device to:

receive, from a first wireless device associated with a first BSS, a first control message indicating one or more service periods designated for spatial reuse or one or more transmission opportunities designated for spatial reuse and an interference threshold associated with the one or more service periods or the one or more transmission opportunities designated for spatial reuse;

receive, from the first wireless device during a first service period of the one or more service periods or during a first transmission opportunity of the one or more transmission opportunities, a second control message; and communicate, during the first service period or during the first transmission opportunity, with one or more third wireless devices, wherein respective transmission powers of the communication are in accordance with the interference threshold and a pathloss associated with the second control message.

11. The second wireless device of claim 10, wherein the processing system is further configured to cause the second wireless device to:

receive one or more respective clear to send messages from one or more fourth wireless devices associated with the first BSS, wherein the second control message is a multi-user request to send message, and wherein the one or more respective clear to send messages are responsive to the multi-user request to send message, wherein the pathloss associated with the second control message is identified from one or more respective pathlosses associated with the one or more respective clear to send messages, and wherein communicating with the one or more third wireless devices includes transmitting one or more respective downlink data communications to the one or more third wireless devices.

12. The second wireless device of claim 11, wherein the processing system is further configured to cause the second wireless device to:

receive an indication of the one or more respective pathlosses between the first wireless device and the one or more third wireless devices.

13. The second wireless device of claim 11, wherein the processing system is further configured to cause the second wireless device to:

measure one or more respective received signal strength indicators of the one or more respective clear to send messages, wherein the one or more respective pathlosses are associated with the one or more respective received signal strength indicators and a reference transmission power indicated in the first control message.

14. The second wireless device of claim 10, wherein the processing system is further configured to cause the second wireless device to:

receive, from the first wireless device, an uplink grant for one or more fourth wireless devices associated with the first BSS, wherein the second control message is the uplink grant; and forward, to the one or more third wireless devices, the uplink grant.

15. The second wireless device of claim 10, wherein the processing system is further configured to cause the second wireless device to:

measure a transmission power of the second control message, wherein the pathloss associated with the second control message is associated with the transmission power; and transmit, to the one or more third wireless devices, a maximum transmission power for the first service period in accordance with the transmission power and the interference threshold, wherein communicating with the one or more third wireless devices includes receiving one or more respective uplink data communications from the one or more third wireless devices, and wherein the respective transmission powers of the communication are less than or equal to the maximum transmission power.

16. The second wireless device of claim 10, wherein the processing system is further configured to cause the second wireless device to:

receive, from the first wireless device, an indication of a first network allocation vector associated with first BSS for the first service period, wherein communicating with the one or more third wireless devices is in accordance with a second network allocation vector associated with the second BSS.

17. The second wireless device of claim 10, wherein the first control message indicates one of a downlink or an uplink direction of data communications associated with each of the one or more service periods designated for spatial reuse.

18. The second wireless device of claim 10, wherein the processing system is further configured to cause the second wireless device to:

communicate with the one or more third wireless devices during a second service period, wherein the second service period is different than the one or more service periods designated for spatial reuse, and wherein the second service period is subsequent to the first service period and prior to a third service period of the one or more service periods designated for spatial reuse.

19. The second wireless device of claim 10, wherein the processing system is further configured to cause the second wireless device to:

transmit, to the one or more third wireless devices, a third control message in response to the first control message and prior to the first service period, the third control message indicating the one or more service periods designated for spatial reuse.

20. A method for wireless communications by a first wireless device associated with a first basic service set (BSS), comprising:

transmitting, to a second wireless device associated with a second BSS, a first control message indicating one or more service periods designated for spatial reuse or one or more transmission opportunities designated for spatial reuse and an interference threshold associated with the one or more service periods or the one or more transmission opportunities;

transmitting, during a first service period of the one or more service periods or during a first transmission opportunity of the one or more transmission opportunities, a second control message to one or more third wireless devices associated with the first BSS, the second control message includes an indication of service for the one or more third wireless devices; and communicating, during the first service period or during the first transmission opportunity, with the one or more third wireless devices, wherein respective transmission powers of the communication are in accordance with the interference threshold.

* * * * *